(12) United States Patent
McAllister

(10) Patent No.: US 8,228,198 B2
(45) Date of Patent: Jul. 24, 2012

(54) SYSTEMS, METHODS, AND DEVICES FOR COMMISSIONING WIRELESS SENSORS

(75) Inventor: Clarke McAllister, Eugene, OR (US)

(73) Assignee: ADASA Inc., Eugene, OR (US)

( * ) Notice: Subject to any disclaimer, the term of this patent is extended or adjusted under 35 U.S.C. 154(b) by 0 days.

(21) Appl. No.: 12/820,109

(22) Filed: Jun. 21, 2010

(65) Prior Publication Data

US 2010/0283584 A1   Nov. 11, 2010

Related U.S. Application Data

(63) Continuation-in-part of application No. 11/465,712, filed on Aug. 18, 2006, now Pat. No. 7,830,258, and a continuation-in-part of application No. 12/124,768, filed on May 21, 2008, now abandoned.

(60) Provisional application No. 60/709,713, filed on Aug. 19, 2005, provisional application No. 60/939,603, filed on May 22, 2007.

(51) Int. Cl.
*G08B 13/14* (2006.01)

(52) U.S. Cl. ............. 340/572.1; 340/10.51; 340/572.8; 340/693.5

(58) Field of Classification Search .... 340/572.1–572.9, 340/10.1–10.6, 693.5
See application file for complete search history.

(56) References Cited

U.S. PATENT DOCUMENTS

| | | | |
|---|---|---|---|
| 5,227,617 A | 7/1993 | Christopher |
| 5,280,159 A | 1/1994 | Schultz |
| 5,382,784 A | 1/1995 | Eberhardt |
| 5,763,867 A | 6/1998 | Main |
| 5,825,045 A | 10/1998 | Koenck |
| 5,850,187 A | 12/1998 | Carrender |
| 5,962,837 A | 10/1999 | Main |
| 6,078,251 A | 6/2000 | Landt |
| 6,130,613 A | 10/2000 | Eberhardt |
| 6,195,053 B1 | 2/2001 | Kodukula |
| 6,246,326 B1 | 6/2001 | Wiklof |
| 6,279,638 B1 | 8/2001 | Goodwin |
| 6,280,544 B1 | 8/2001 | Fox |
| 6,332,098 B2 | 12/2001 | Ross |
| 6,357,662 B1 | 3/2002 | Helton |
| 6,379,058 B1 | 4/2002 | Petteruti |
| 6,409,401 B1 | 6/2002 | Petteruti |
| 6,415,978 B1 | 7/2002 | McAllister |
| 6,478,229 B1 | 11/2002 | Epstein |
| 6,481,907 B2 | 11/2002 | Banach |
| 6,486,780 B1 | 11/2002 | Garber |
| 6,532,346 B2 | 3/2003 | Gallivan |
| 6,677,852 B1 | 1/2004 | Landt |
| 6,805,183 B2 | 10/2004 | Goodwin |
| 6,830,181 B1 | 12/2004 | Bennett |
| 6,848,616 B2 | 2/2005 | Tsirline |
| 6,857,714 B2 | 2/2005 | Hohberger et al. |
| 6,884,312 B2 | 4/2005 | Mitchell |
| 6,899,476 B1 | 5/2005 | Barrus |
| 6,963,351 B2 | 11/2005 | Squires |

(Continued)

*Primary Examiner* — Thomas Mullen
(74) *Attorney, Agent, or Firm* — Peter A. Haas Esquire LLC

(57) ABSTRACT

In one embodiment the present invention comprises a bar code scanner and an encoder for commissioning RFID transponders and includes a housing encasing a motor assembly, an RFID interrogator, a wireless communication means for transferring instructions and data from and to a remote host, on-board memory, a processor, and an antenna with corresponding mechanism to encode and verify a programmable RFID transponder. The present invention further includes novel methods for commissioning RFID transponders.

19 Claims, 19 Drawing Sheets

U.S. PATENT DOCUMENTS

| | | |
|---|---|---|
| 7,066,667 B2 | 6/2006 | Chapman |
| 7,069,251 B1 | 6/2006 | Bartz |
| 7,073,712 B2 | 7/2006 | Jusas |
| 7,075,435 B2 | 7/2006 | Jesser |
| 7,114,655 B2 | 10/2006 | Chapman |
| 7,187,294 B2 | 3/2007 | Burdette |
| 7,223,030 B2 | 5/2007 | Fessler |
| 7,249,819 B2 | 7/2007 | Burdette |
| 7,320,432 B2 | 1/2008 | Sureaud |
| 7,421,367 B2 | 9/2008 | Nye |
| 7,551,087 B2 | 6/2009 | McAllister |
| 7,664,257 B2 | 2/2010 | Hohberger |
| 2002/0005774 A1 | 1/2002 | Rudolph |
| 2002/0059880 A1 | 5/2002 | Klinefelter |
| 2003/0227528 A1 | 12/2003 | Hohberger |
| 2004/0074964 A1 | 4/2004 | Falkenrich-wesche |
| 2004/0124235 A1 | 7/2004 | White |
| 2004/0141790 A1 | 7/2004 | Waters |
| 2005/0045724 A1 | 3/2005 | Tsirline |
| 2005/0218219 A1 | 10/2005 | Sano |
| 2005/0280537 A1 | 12/2005 | Feltz |
| 2005/0283272 A1 | 12/2005 | Roberts |
| 2006/0080819 A1 | 4/2006 | McAllister |
| 2007/0150219 A1 | 6/2007 | Cawker |
| 2009/0045919 A1* | 2/2009 | Fukui et al. .................. 340/10.1 |

* cited by examiner

SYSTEMS, METHODS, AND DEVICES FOR COMMISSIONING WIRELESS SENSORS

RELATED APPLICATIONS

The present application is a continuation-in-part application based on U.S. patent application Ser. No. 11/465,712 (U.S. Pat. No. 7,830,258) filed on 18 Aug. 2006, which claims benefit claims benefit under 35 USC Section 119(e) of U.S. Patent Application No. 60/709,713 filed on 19 Aug. 2005, and a continuation-in-part of U.S. patent application Ser. No. 12/124,768 (abandoned) filed on 21 May 2008, which claims benefit claims benefit under 35 USC Section 119(e) of U.S. Provisional Patent App. No. 60/939,603 filed on 22 May 2007, all by the same inventor Clarke W. McAllister. The present application is based on and claims priority from these applications, the disclosures of which are hereby expressly incorporated herein by reference.

BACKGROUND

The present invention relates to a system, including methods and devices, utilizing wireless sensor devices and RFID (radio-frequency identification) transponders. Specifically, the present invention relates to a system incorporating novel devices and methods that enable point-of-use and on-demand commissioning of RFID transponder-equipped wireless sensors.

Radio-frequency identification (RFID) transponders enable improved identification and tracking of objects by encoding data electronically in a compact tag or label. And, advantageously, the compact tag or label does not need external, optically recognizable or human-readable markings. In fact, using the Gen2 EPC specification, a three-meter read-distance for RFID transponders is common—even on high-speed material handling lines.

Radio-frequency identification (RFID) transponders, typically thin transceivers that include an integrated circuit chip having radio frequency circuits, control logic, memory and an antenna structure mounted on a supporting substrate, enable vast amounts of information to be encoded and stored and have unique identification. Commissioning, the process of encoding specific information (for example, data representing an object identifier, the date-code, batch, customer name, origin, destination, quantity, and items) associated with an object (for example, a shipping container), associates a specific object with a unique RFID transponder. The commissioned transponder responds to coded RF signals and, therefore, readily can be interrogated by external devices to reveal the data associated with the transponder.

Current classes of RFID transponders rank into two primary categories: active RFID transponders and passive RFID transponders. Active RFID transponders include an integrated power source capable of self-generating signals, which may be used by other, remote reading devices to interpret the data associated with the transponder. Active transponders include batteries and, historically, are considered considerably more expensive than passive RFID transponders. Passive RFID transponders backscatter incident RF energy to specially designed remote devices such as interrogators.

Combining the benefits of the latest technology in RFID transponders with sensing devices, a broader class of devices called wireless sensors is emerging. Wireless sensors have a unique identity, sense one or more attributes within its environment, and report its identity and data corresponding to the sensed attributes. For example, a wireless sensor interprets environmental conditions such as temperature, moisture, sunlight, seismic activity, biological, chemical or nuclear materials, specific molecules, shock, vibration, location, or other environmental parameters. Wireless sensors are distributed nodes of computing networks that are interconnected by wired and wireless interfaces.

Wireless sensors, made using silicon circuits, polymer circuits, optical modulation indicia, an encoded quartz crystal diode, or Surface Acoustic Wave (SAW) materials to affect radio frequency or other signaling methods, communicate wirelessly to other devices. For example, certain embodiments of wireless sensors communicate on a peer-to-peer basis to an interrogator or a mobile computer. Communication methods include narrow band, wide band, ultra wide band, or other means of radio or signal propagation methods.

Additional examples of RFID transponders, wireless tags, and wireless sensors are more fully discussed in this inventor's co-pending U.S. Patent Application Publication No. 2006/0080819, entitled "Systems and Methods for Deployment and Recycling of RFID Tags, Wireless Sensors, and the Containers Attached thereto," published on 20 Apr. 2006, which is incorporated by reference for all purposes in this document.

One problem of prior-art systems, such as conventional print labels or bar code systems includes a requirement for line of sight and an overdependence on the optical quality of the label. Many factors can render such a label unreadable including printing errors, excess ink, insufficient ink, physical destruction of the markings, obstruction of the markings due to foreign matter, and, in extreme cases, outright deception by placing an altered label over the top of such a print label.

RFID transponder labeling eliminates the need for an optically readable print label and overcomes all of the shortcomings related to print quality and the need for line of sight to scan the label. Moreover, RFID transponder labels enable secure data encryption, making outright deception considerably less likely to occur. However, current RFID label systems have their own limitations as well.

One shortfall of prior-art RFID systems is the total cost for encoding and applying wireless sensors. In the case of manual encoding and application of RFID transponders or wireless sensors, the cost is dominated by labor costs. Therefore business process integration plays a significant role in reducing the total cost of ownership of tagging objects. For example, in many supply chain applications, case picking is performed during the fulfillment of a customer order, this is an operation where individual cases or groups of cases are manually handled. Similarly in receiving of goods at retail, manufacturing, or distribution receiving docks are other business process where individual cases are manually handled. In either of these types of business processes where individual cartons are handled, there is an opportunity to encode and apply an RFID tag or wireless sensor to each carton on a selective basis.

Generating a unique serial number is imperative, and is required for EPCglobal RFID tagging implementations. Serialization requires a central issuing authority of numbers for manufacturers, products, and items to guarantee uniqueness and to avoid duplication of numbers. Blocks of numbers are distributed to remote locations globally. Unless a product (or SKU) is serialized at one location, the numbering space is usually partitioned according to some method, or each remote location receives each number one-by-one. Either way, there is eventually a reconciliation of serial number usage with a granularity of either one or several numbers at a time.

A preferred method of generating unique serial numbers is to assign unique numbers in a central location, such as in a label converter facility where unique bar coded labels are printed. Each unique label is then packed and shipped to remote locations, usually either in sheets or rolls. Upon arrival at a manufacturing facility, rolls are loaded onto high speed label applicators that apply one serialized label onto each carton. As those serialized cartons move through the supply chain, they may eventually arrive at a case pick location, a receiving dock, or similar location where a serialized carton is selected for having an RFID transponder applied to it. Using a bar code scanner to read one or more bar codes sufficient information can be collected to uniquely encode that data into an RFID transponder and apply it to that carton.

The uniqueness of an identifier is critical to the success of almost any tracking system. Assuring uniqueness is not necessarily simple. A generically descriptive bar code can be matched to authorizations for selected numbering systems that provide additional data fields including a unique serial number or using algorithms that assure uniqueness through numerical representations of time and space.

Certain prior art systems use printer encoders to merge the printing and RFID transponder encoding operations into a single atomic transaction. This method is more expensive in every respect. It requires mobile distributed printing with nearly perfect networking implementations in order to achieve a smooth, easy, and regular manual transponder application process. This all comes at a higher price, size, and weight. Prior art implementations tend not to be mobile, as represented by U.S. Pat. No. 7,066,667 issued to Chapman et al. on 27 Jun. 2006 and include U.S. Pat. No. 5,899,476 issued to Barrus et al. on 31 May 2005, or by U.S. Pat. No. 6,246,326 issued to Wiklof et al. on 12 Jun. 2001, describe a device that commissions an RFID transponder with a printed label. This approach, however, introduces unnecessary waste, cost, and propensities for error. There is a growing category of applications that do not require anything other than a custom-encoded RFID transponder. This prior art calls for the inclusion of label printer hardware and related consumable materials that are not necessary for many RFID applications. Unneeded printer mechanisms create unnecessary complexities, size, and weight. In some instances this additional bulk hinders practical mobile applications. The result is that tagging solutions that include printing result in a higher total cost of ownership than a pure RF tag encoding system.

U.S. Patent Application No. 2003/0227528 by Hohberger et al. published on 11 Dec. 2003 describes another attempt at improving demand-print labels by providing a device that combines two standard, die-cut rolls of media, one of which may be a roll of RFID transponders, and the second, print-label stock, in an attempt to provide on-demand smart labels. As with the aforementioned references, this approach adds unnecessary cost and complexity by combining RFID transponders with demand-printed labels.

U.S. Pat. No. 5,382,784, published on Jan. 17, 1995, inventor Eberhardt describes a hand-held dual technology identification tag reading head with a gun-shaped housing and a trigger switch with two different ON positions. This patent discloses a hand-held device with a light transmissive window at one end, through which bar code scanning light passes and around which an RFID reading antenna is positioned. Eberhardt discloses embodiments for reading either bar code or RFID information from a label using a hand-held, dual-position trigger actuated device. This patent fails to offer any methods or devices for reading bar code information and using that information to encode an RFID transponder. In particular this patent fails to disclose any methods for conveyance of RFID transponders as part of a well-controlled transponder encoding process.

U.S. Pat. No. 6,486,780, published on Nov. 26 2002, inventors Garber et al disclose a hand-held item location device using RFID to seek and find library books. The disclosure emphasizes the importance of read range over great distances and large populations of RFID transponders, a quality that runs counter to the present invention that teaches how to localize radio frequency fields for programming only selected RFID transponders presented in succession for well-controlled encoding. Garber teaches techniques for searching and reading large collections of transponders in a library, not semi-automated transponder commissioning processes. The physics of Garber's invention is poorly suited to programming anything other than one transponder at a time that is carefully isolated by great distances from any other RFID transponder to avoid programming information into the wrong transponder.

U.S. Pat. No. 5,280,159, published on Jan. 18, 1994, inventors Schulz et al. discloses a pistol-grip RFID reader with a separate hand-held data terminal which together are used to read RFID transponders. Again this invention, like other prior art fails to teach a viable method or apparatus for reliable commissioning large volumes of RFID transponders.

Inventors Main and Kassens disclose in U.S. Pat. No. 5,763,867 published on Jun. 9, 1998, a hand-held data terminal with various scanner modules for the purpose of data acquisition. This patent, along with their subsequent and related disclosure in U.S. Pat. No. 5,962,837 published on Oct. 5, 1999, are examples of hand-held data collection devices for sweeping an RFID interrogation beam about an broad area around an operator (for example, a storage room or bulk-shelf location in a warehouse). This operating distance, however, lies beyond a close-range distance of a couple of inches and is limited to interrogation and data-acquisition, not encoding. Further, such devices are unable to limit their communication to RFID transponders that are in close-proximity of a few inches of the operator holding a hand-held encoder that includes a near field coupler.

Inventors Carrender, Landt, and Speirs disclose in their Dec. 15, 1998 U.S. Pat. No. 5,850,187 another RFID reader that is designed "to allow for identification of objects at locations removed from the remote host unit". This patent along with their Jun. 20, 2000 U.S. Pat. No. 6,078,251, "retrieve object identification data from a selected object." fail to address controlling the inherently propagative nature of the electric fields of radio waves in order to restrict their range to within the width of a single transponder.

U.S. Pat. No. 6,195,053 published on 27 Feb. 2001 by inventors Kodukula and Ackley discloses an antenna consisting of a U-shaped conductive bracket, which supports an optical reader and communicates with RFID transponders. However, this disclosure does not address the need for shielding and near-field coupler design to optimize the inherent long-range characteristics of the RFID transponder.

Inventors Helton and Wiklof's 19 Mar. 2002 U.S. Pat. No. 6,357,662 discloses a device that a user can selectively control a bar code scanner and an RFID reader to acquire information about an asset. However, this disclosure does not address creating and encoding a unique identifier for attachment to and subsequent identification of the asset.

Zebra Technologies Corporation's Tsirline is the principal inventor of U.S. Pat. No. 6,848,616 (published on 1 Feb. 2005 to Tsirline et al.) with the title "System and method for selective communication with RFID transponders". In that patent the inventors describe a system having an RFID transceiver that is adapted to communicate exclusively with a single RFID transponder. They disclose that the system includes a printhead and a magnetic flux generator having a planar coil formed as a trace upon a first layer of a printed circuit board. As with the aforementioned references, this approach adds unnecessary cost and complexity by combining RFID transponders with demand-printed labels, and uses a near field coupler design that does not concentrate the magnetic flux as selectively as the present invention disclosed herein.

U.S. Pat. No. 7,223,030 by Fessler et al (published on 29 May 2007) and U.S. Pat. Nos. 7,249,819 (issued on 31 Jul. 2007) and 7,187,294 (issued on 6 Mar. 2007) both by Burdette et al, (inventors of Lexmark International, Inc.) disclose a printer/encoder system, and attempt to overcome the problems of detecting and locating an RFID inlay that is embedded somewhere in a printed label stock. The present invention overcomes that problem by eliminating the (larger) label, and only encoding RFID transponders, which generally have a physical outer dimension that very closely matches the embedded RFID transponder inlay dimensions.

United States Published Patent Application No. 2007/0150219, published on 28 Jun. 2007, inventor Cawker et al. of Weyerhaeuser Company, discloses a method of applying and verifying RFID transponders using a conveyor for moving objects along a predetermined path. Their invention makes use of cameras to identify the proper position for a label. The present invention overcomes the size and cost requirements of a system comprised of a conveyor and cameras by using human operators for motion and simple reflective beam sensors for spatial positioning and label placement.

Inventor Roberts in U.S. Published Patent Application No. 2005/0283272, published on 22 Dec. 2005, teaches of a mobile encoding system for commissioning RFID transponders. Wherein, Roberts claims an apparatus for dispensing and activating electronic monitoring devices comprising: a) a receptacle capable of storing a supply of unactivated electronic monitoring devices; b) a separator cooperating with said receptacle for removing respective individual monitoring devices from the receptacle; c) an activator cooperating with said separator and configured to communicate an activation signal to an individual monitoring device removed from the receptacle by the separator; d) a verifier configured to communicate with the individual monitoring device subsequent to the activation signal to obtain a verification signal confirming that the individual monitoring device has been activated; and e) a dispenser cooperating with said verifier and operable for dispensing the individual monitoring device after receipt of a verification signal confirming that the individual monitoring device has been activated. Roberts patent application 2005/0283272 does not teach how an EM device is attached to an object that will be monitored. There is no mention of adhesives, screws, or any other means of attachment. This is in contrast to the present invention where adhesives are used to attach an RFID transponder to an object of the proper object class. In the case of an SGTIN, the term object class refers to the GTIN (Global Trade Item Number) or SKU (Stock Keeping Unit). The term object class would correspond to other class definitions for other GS1 key types that are for example defined in the EPCglobal Tag Data Standards. An object is an instance of the corresponding object class and an object class instance number is a numerical representation of an object class instance. In fact, it can be inferred that Roberts' EM devices have no exposed adhesive while they are being encoded, sorted, and stacked. Exposing an adhesive during these steps would obviously result in an unintended grouping of EM devices, stuck together, preventing passage of any additional EM devices. The problems addressed by the present invention require an additional and vital step that is not taught by Roberts' patent application: to associate and preferably attach an EM device to the correct type of object. Associating an encoded EM device of the correct type to an object of the correct type, is a vital step that is significantly prone to human error. Roberts does not teach any method for advancing and detaching programmed EM devices or RFID tags from a roll of conveyance web or release liner. Roberts only teaches that tags can be cut from a roll of EM devices that are separated by a perforation, but does provide any explanation regarding forward advancement of such a roll in coordination with the programming of EM devices: if the process is a continuous motion, or a start-stop action that is coordinated with the tag programming process. This is in contrast to Roberts' detailed explanation of the movements of other parts of the EM device dispensing apparatus. Detaching adhesive-backed tags is a critical process that leads to a transfer and subsequent attachment to an object that is only of the correct object class type.

Inventor Landt in U.S. Pat. No. 6,677,852, published on 13 Jan. 2004, teaches a: supply reel and take up reel means; radio frequency shielding; a means for associating data read from an RFID transponder with new data; a means for encoding authorization from an external authority for a selected numbering system; a plurality of authorization transponders adapted to provide the RFID transponder encoder device sets of preauthorized blocks of unique numbers for specific object classes; and acquiring object class information to encode multiple instances of unique number from that object class instance information in the transponder. Landt fails to describe how the uniqueness of numbers is assured. In fact, the issue of uniqueness is not adequately addressed in his U.S. Pat. No. 6,677,852. His only mention of uniqueness is suggested only as a possibility, whereas it is actually imperative to the proper functioning of a global tracking system such as that which is enabled by the EPCglobal numbering system. Landt fails to describe any authorizations that are related to numerical uniqueness. Instead, Landt's authorization keys must match a security field that is already present within a tag. Therefore Landt's authorization tags are like a password that unlocks a tag to enable it to receive new data. This is in contrast to an authorization to a tag encoder to authorize it to issue unique numbers to tags, regardless of any password requirements that may or may not exist. Despite Landt's efforts to broadly describe the instructions, he falls short of showing that he in any way anticipates the need for or challenges of writing unique serial numbers to uniquely identify RFID tags. His only mention of tag ID, number field 208, only relates to the essential presence of the field and the possible need to search through a population of tags by using the tag ID field. Furthermore, Landt demonstrates a lack of appreciation for the vital importance of having a unique tag ID, which is central to the premise of tracking objects within a global supply chain, when he states "The tag ID number field 204 provides a serial number or other identifying number for the data tag 102, which may be a unique number.", which indicates that Landt did not understand that uniquely numbered tags are an essential part of using numbering systems such as the GS1 EPCglobal system. To further illustrate this point, Landt makes no mention of any numbering system that would be well known to those skilled in the art to assure numerical uniqueness in a tag ID field 204 or any other field disclosed in his invention. In Landt's discussion of writing to RFID tags, he never provides any information that would suggest that his invention is capable of assuring that unique tag ID's are written to tags, nor even describes writing tag ID's in any manner. Therefore it is apparent that U.S. Pat. No. 6,677,852 falls short of disclosing a data carrier of any kind that carries with it unique authorizations that are to be used by an RFID tag encoder for assuring that any tag ID's written to an RFID tag originate from a central number-issuing authority (such as from Uniform Code Council, GS1, Auto-ID Center, EPCglobal, ISO, etc.).

In U.S. Pat. No. 7,114,655, published on 3 Oct. 2006, inventor Chapman teaches the use of an RFID printer system, a printer programming language that contains RFID encoding instructions, and a conveyor system to move objects through the printing and encoding process. The prior art teaches how to encode data into an RFID label. The present invention teaches how to encode data into an RFID tag. An RFID tag is not an RFID label. An RFID label contains additional face stock material as a printing surface. That surface is printed with human readable and or optically machine-readable indicia. The printed information is not required for reading data using a radio frequency signal.

Chapman's invention requires a conveyor which is not required for the solution that the present invention teaches. In fact, a conveyor would in many instances be either an added capital expense or a hindrance to a business process for tagging products away from a conveyor line.

Chapman's invention teaches that preset spatial relationships exist between the bar code label and the RFID tag that is to be placed onto a package. A key assumption of the prior art is that the surface of the package or the contents thereof will not interfere with the proper operation of the RFID tag. This is in contrast to the present invention whereby specifically identified locations are marked on the package that indicate where the RFID will function properly. Specifically what Chapman fails to address in his invention is the need for placement of an RFID tag in a location on a carton such that the carton and its contents do not interfere with the nominal operation of the tag as it would have operated in free space. In stark contrast to Chapman's teachings and suggestions, the present invention, by way of the motion of a human hand and arm, can achieve full six degrees of freedom for the placement of an RFID tag in a location that corresponds to the sweet spot of each particular carton or package. The present invention addresses the need for six-axes of motion, placement on a predefined sweet spot, correlation to each specific type of product, and the possible need for tags to have a thickness dimension.

Chapman's invention does not teach the use of a trigger that is responsive to the applicator's position and orientation relative to a tagging sweet spot. In the present invention, several means are disclosed for triggering the application of an encoded tag only when the applicator is within striking distance of the target location. Such a trigger goes beyond the temporal or spatial inaccuracies that would result from using a conventional human-operated trigger from a button-press or keypad input.

Lastly, Chapman's invention requires the data stream to also contain information that describes the location of the RFID inlay within the RFID label or tag. Without that information, the prior art is unable to direct the RFID interrogation fields to the correct area on each label. The prior art depends on having these external programming instructions for proper functioning.

Inventor Waters in U.S. Pat. No. 7,077,489, published on 18 Jul. 2006, teaches an apparatus for printing and memory tag application onto a base medium. Waters fails to make the case for achieving the required functionality on a typical RFID tag. Water's invention is restricted to the use of specially prepared RFID tags that have adhesive on both sides of the tag. This unconventional tag configuration must overcome the adhesive forces that attach the tag to the webbing by having stronger adhesive forces that provide the force that is necessary to overcome the first adhesive bond. Waters fails to explain this acute short coming and relies upon this critical factor for successful transfer of the tag on each "thump". In the absence of a proper control of this critical factor, the tags will not release, or will partially release, causing the applicator to clog or jam. The present invention overcomes these sever short comings by using a conventional RFID tag with adhesive on only one side, eliminating any chance of a misbalance between adhesive forces between a first and a second side of the RFID tag. This is a significant and novel differentiation from the Waters patent.

Inventor Koenck in U.S. Pat. No. 5,825,045, published on 20 Oct. 1998, teaches a housing assembly for enclosing the internal antenna and a handle coupled to a surface of the housing. Koenck is among many inventors who disclose hand-held devices that function in an automatic data capture role, including bar code scanners, portable data terminals, and RFID tag readers. However, the present invention stands apart from this and other prior art in providing an ergonomically superior solution for a human-operated RFID tag encoder that directly applies encoded RFID tags to the face of a target object. Neither Koenck nor a myriad of other inventors disclose how RFID tags are to be uniquely encoded, verified, and efficiently applied to objects using a single swipe of an operator's hand and arm motion.

In U.S. Pat. No. 6,963,351, published on 8 Nov. 2005, inventors Squires et al describe a radio frequency identification tag non-destructively connected to the core adjacent the first or second end thereof to allow non-destructive removal of the tag, the tag having an aperture formed there through that is configured to allow passage through the tag of at least a portion of the spindle when the core is disposed on the spindle, and the aperture being aligned with the rotation axis. Attachment to the spindle requires a circular shaped loop antenna element which those skilled in the art understand involves more manufacturing steps than a conventional UHF RFID tag of the present invention. The additional steps include critical mechanical dimensioning to both ensure proper mechanical clearances as well as maintaining proper tuning of the antenna across the full range of operating conditions whereby full or empty rolls of media have the propensity to differently alter the tuning characteristics of the circular RFID device. The present invention overcomes the limitations of the need for an RFID memory device that it attached to the spindle of a roll of consumable items.

Inventor Nye in U.S. Pat. No. 7,421,367, published on 22 Jun. 2006, teaches a housing assembly for enclosing the internal antenna or a mounting mechanism for selectively coupling the encoding system to a provided structure. The present invention encloses the antenna, interrogator, drive train, and most other components in a housing for protection, but also to allow the operator of the encoding device to easily attach and remove an RFID transponder cartridge. The novel design of the housing and chassis allows this by grouping and hiding all other components that do not need to be accessed by the operator. By doing so, it's obvious to the operator at first sight where and how the cartridge attaches. Nye's intention is to simply use the housing and structure to mount all components and to protect those components. The present invention's housing design goes beyond Nye's intention by allowing the operator of the encoder to easily mount a cartridge given the housing and structure design.

Inventor Nikitin in U.S. Published Patent Application No. 2008/0184177, published on 7 Aug. 2008, teaches the measuring of the angular velocity of a moving roll in order to monitor the performance of that roll. Nikitin is measuring the angular velocity of a roll, not the rate at which a transponder peels from the release liner. The present invention is concerned with matching the peel rate of a transponder to that that of the rate of movement of the target surface, both linear velocity measurements. Additionally, the rate measurements are used in the present invention not to simply monitor a system, but used as input data in an algorithm to successfully apply an RFID transponder to a target surface in one swipe of the operators arm.

Inventor Eberhardt in U.S. Pat. No. 6,130,613, published on 10 Oct. 2000, teaches of applying an RFID transponder to a target surface. Eberhardt discloses the design and production of a RF enabled stamp that a postal consumer can use like a traditional stamp. This includes the customer peeling the stamp off a release liner, or licking the back of stamp; then applying the stamp to a letter or parcel. The underlying concern of the present invention is reducing the cost of encoding and applying an RFID transponder to an object. The methods of applying an RF stamp to a target surface, as disclosed by Eberhardt, are not easily and quickly conducted. The consumer is going through multiple steps, unnecessary motions to apply an RF stamp. The present invention allows the operator of an RF encoder to encode and apply an RFID transponder in one motion of the operator's arm. This is certainly not the case intended by U.S. Pat. No. 6,130,613.

Inventor Feltz in U.S. Published Patent Application No. 2005/0280537, published on 22 Dec. 2005, discloses a system for reading and writing to an RFID transponder. The present invention cannot be anticipated by Feltz because an encoder is no more a printer than a tag is a label. Labels, particularly "SmartLabels" include a significant amount of printable surface area on the face stock material for printing symbols that are both human and machine readable. RFID tags and transponders may or may not contain such printable area, instead RFID tags and transponders provide wireless identification functions that are meant to supplement the optically readable functions of labels.

Tags are not Labels.

A key characteristic of the encoder of the present invention is that the encoder encodes tags of many different types, shapes, sizes, and thicknesses; which includes efficiently encoding thick tags, tags that are thicker than a sheet of paper because a foam layer is present. Such a tag design is advantageous for tagging metals or liquid containers.

Feltz illustrates in FIG. 2 the type of RFID transponder that is added to labels in order to make them compliant with retailer and DOD mandates. It is well known to those skilled in the art that such an RFID transponder will not operate when placed near metal or liquid. Those skilled in the art know that metal detunes the RFID transponder's antenna, and that liquids absorb radio energy just as they would in a microwave oven, resulting in heat, not RF communication. There are two dominant and notoriously well known mandates—Wal-Mart and the DOD. Both of those mandates clearly stated that only an RFID transponder had to be added to the previous labeling requirements. Those mandates also required that the transponders work after they were applied to the goods.

Retailer and DOD tagging mandates were clear, that the goods being tagged had to read, regardless of their construction, even foil-wrapped cartons, metalized mylar wrappers, and cases of liquids of all types had to read. This posed a problem for customers that bought RFID printers from Feltz's company. They found that the RFID tags that were encoded on his printer were not able to function when placed onto about 20% of the goods that are normally found in a retail supply chain. As such, Feltz does not really solve the mandate problem that he refers to in his paragraph [0005] where he makes the inaccurate statement that "One requirement is that certain record members e.g., compliance labels contain transponders". Feltz has it backwards; the U.S. Department of Defense and Wal-Mart RFID tagging requirements did not require any new labels at all. In fact, both mandates (which were the dominant, if not the only ones at the time) were written to provide their suppliers with a full range of compliance options, including the option of embedding an RFID transponder directly into a corrugated carton (for example), which would completely eliminate the need for any kind of label whatsoever.

Feltz' printer mechanism did not actually need print heads, ribbons, or ink to comply with the mandates; yet his design is completely based around these unnecessary elements. Even worse, those elements prevent his invention from dispensing the thicker type of RFID tag that actually works on what those skilled in the art refer to as "RF-challenged" goods that contain metal or liquid. Specifically, the anticipating reference is inoperable with thicker tags because the fixed spacing between platen roll 63 and print head 69 of the Feltz printer invention is sized for thin paper-like labels, not thick dielectric-backed tags. Attempting to encode tags with a dielectric foam spacer would clog the printer with a mass of sticky detached RFID tags that would quickly accumulate in a useless clump at print head 69. The extra bulk reduces the mobility of his printer and consumes significantly more power, whereby ruling out any anticipation of a battery operated mobile encoder.

Tags: Thick or Thin.

The encoder of the present invention programs and verifies tags and transponders of almost any type including transponders with a dielectric spacer built into them. Note that this type of compliance tag is much thicker than the labels that Feltz discloses in his FIG. 2. A transponder with a dielectric spacer is at least ⅛" thick and will easily pass through the feed mechanism of the present invention.

Smaller Tags.

Since the mandates did not require any more labels, and the items that are to be tagged include branded items and containers, the brand owners do not want their brand images and products with big stickers all over them. Therefore, smaller and less obvious is better and more appealing to consumers and brand owners. Feltz struggled with this, as is stated in his paragraphs [0005] and [0007] wherein he states that his invention provides for labels that have transponders spaced at a distance of 6 inches, which is an improvement over prior art. It is obvious that Feltz understands that smaller is better when it comes to dispensing large amounts of unnecessary label material.

Poor Resolution.

Had Feltz anticipated the elimination of the print head 69 he could have moved his encoding antenna 500 and 500' closer to delaminator 64'. This would have allowed him to use a smaller label (or even a tag) with a pitch on the order of 0.6" instead of 6". This would have allowed him to put 10 times more tags onto a roll and create far less waste. It is obvious that Feltz did not anticipate any of these things because his antenna selectivity is inadequate for that. His use of microstrip antennae 500' or 550' do not have enough selectivity as shown in his spatial signal strength plots of FIGS. 28 and 29 and his statements in his paragraph [0068] that the tightest recommended tag spacing is 2 inches. Had Feltz anticipated a printerless encoder, he would have strived for spacing that is much tighter than 2 inch tag pitch.

Inventor Bennett in U.S. Pat. No. 6,830,181, published on 14 Dec. 2004, discloses a combination RFID and bar code scanner. Wherein an operator holds a handheld device in one location without moving the device and is able to read a bar code and read/write to an RFID transponder in the near vicinity. In the scenario that the RFID transponder is already on the package, Bennett's invention is an efficient device to encode RFID transponders with information gathered from the bar code scan. Though in the scenario that the RFID transponder is not already on the package, Bennett's novel ideas are no longer of much value. At which point, a majority of the operator's time and energy will go towards peeling an RFID transponder from its release liner and placing it on the package. The present invention increases the operator's efficiency by peeling and encoding the RFID transponder before it is placed on the package. In the present invention, the encoding occurs after the operator scans the bar code on the package and before the operator is able to reach and remove the transponder from the encoder. As such, the present invention allows an operator to be that much more efficient in commissioning RFID transponders by not waiting on encoding and peeling. By not having a means to peel an RFID transponder from its release liner, Bennett's invention is at a major disadvantage in tagging large volumes of item level consumer goods.

Inventor Sureaud in U.S. Pat. No. 7,320,432, published on 25 Jan. 2005, discloses a system for reading and encoding the output of an identification printer. The system provides a portable device that can be adapted to the output of standard bar code printers, capable of reading the bar code of labels produced by the printer and encoding the chip of the same label with the information read without any modification and interaction being required with the system installed to which the printer is attached. The system disclosed by Sureaud applies to the niche application of luggage RFID labels. When compared to the application of item level consumer good tagging, the prior art fails to address 1) the difficulty of efficiently applying RFID transponders to an object, and 2) the difficulty of producing a unique data identifier based off the items stock-keeping unit (SKU). The invention disclosed by Sureaud simply coverts a bar codes numerical string to a binary string. Whereas, the present invention is reading in a SKU, converting that SKU to a unique identifier, and encoding an RFID transponder with that unique identifier. It's important to note that a SKU is not a unique identifier. For example, two packages of identical socks will have the same SKU, but the data encoded into their RFID transponders will be unique to each package. The bar code scanner presented in the present invention is in one way novel in how the data read from the bar code scanner is used in producing the data encoded into an RFID transponder.

Inventors Sano et al in U.S. Published Patent Application No. 2005/0218219, published on 6 Oct. 2005, discloses a label and RFID tag issuing apparatus. Wherein, the label and RFID tag issuing apparatus, comprises: a sensor for detecting presence of an RFID tag attached to a container; a printer for recording information that corresponds to a bar-code affixed to the container; a bar-code reader for reading the bar-code recorded on the container; an RFID tag reader/writer for writing information corresponding to the bar-code to the RFID tag; and a controller for controlling all of said components. Sano is addressing a niche application of RFID technology (factory automation); whereas the present invention is concerned with item level consumer good tagging. Inventor Sano's invention fails to address the needs unique to item level tagging, wherein: no mention or concern is expressed regarding operator efficiency in encoding and apply RFID tags, and no means is provided to ensure unique serialization of an RFID tag while operating off network. Lastly, as mentioned previously, the bar code scanner presented in the present invention is in one way novel in how the data read from the bar code scanner is used in producing the data encoded into an RFID transponder.

In U.S. Pat. No. 6,884,312, published 26 Apr. 2005, inventors Mitchell et al describe a tape applicator with no reference to RFID tags.

In U.S. Patent Application No. 2005/0045724, published 3 Mar. 2005, inventors Tsirline et al describe a printer system comprised of a printhead and RFID components to solve object identification problems. By contrast, the present invention clearly demonstrates that all aspects of printing on, with, or near RFID tags to facilitate identification is a wasteful and unnecessary encumbrance to efficient RFID tagging operations.

In U.S. Patent Application No. 2002/0059880, published 2 Sep. 2008, inventors Klinefelter et al describe a card supply for use with an identification card printing system comprising: a card hopper containing a stack of cards; and a supply circuit mounted to the card hopper and having a memory containing supply information relating to parameters of the card supply. This patent application in contrast to the present invention fails to address the challenges of using a radio frequency identification transponder to provide information about encoding a supply of unencoded RFID transponders. In the present invention the same RFID interrogator that is used to encode RFID transponders is also capable of reading an RFID transponder mounted to the loaded cartridge, and is also preferably capable of filtering out its response to interrogation or programming of RFID transponders. Although Klinefelter describes a dispensing system that remotely resembles the present invention, the inventor clearly fails to address the complexities and interactions between transponders if he had even remotely considered the possibility that the card that are dispensed from his hopper are RFID tags. Furthermore, he fails to address the use of a single RFID interrogator for encoding cards (or tags) as well as interrogating the memory device that contains information about the card supply. The present invention addresses and overcomes these challenges.

In U.S. Pat. No. 7,664,257, published on 16 Feb. 2010, inventors Hohberger and Tsirline disclose a system for authenticating consumable media such as plastic cards, ink, or ribbon cartridges that include an anti-piracy deterrent. The inventors disclose the use of RFID transponders with anti-collision protocols but fail to anticipate that the consumable media could also be a supply of RFID transponders. This is evident in the omission of any attempt to filter out or separate responses from transponders that are themselves consumable media, nor do Hohberger and Tsirline address the challenges of encoding such consumable media using the same interrogator that is used to identify the supply of media. The present invention addresses and solves these challenges.

The present invention manages EPC binary encodings. This is unlike U.S. Pat. No. 7,827,200 wherein serialization of EPC identifiers is managed using the unserialized portion of an EPC ID URN. Encoders read and write the binary encodings of EPC tags, and are therefore able to directly manage object class uniqueness at that level. This avoids inconsistencies that may arise from improper use of the GS1 Tag Data Standard, specifically where the standard teaches that the filter bits are not part of the pure identity. However, in reality GTIN bar codes are frequently used to identify items at item, case, or pallet level when commissioning tags. This poses a problem for a uniqueness-assuring method that only uses the pure identity because a GTIN-14 case level bar code can be scanned in order to identify objects for tagging at the item level. This is frequently encountered during tag-ups where entire warehouses must be encoded with item-level tags.

Using the pure URI method described in U.S. Pat. No. 7,827,200 would result in items that are improperly encoded using case level URI's. The present invention compensates for this real world phenomenon by using the filter value as a correct indication of the intended packaging level and is used to correctly manage the uniqueness of the object class.

A second reason that the present invention is an improvement over prior art for real world EPC encoding is for in-store tagging. Frequently suppliers fail to commission RFID tags onto items as the retailer may have instructed. In that event, the retailer has to quickly muster resources to apply RFID tags to items as they arrive in their stores or distribution centers. Following a strict pure identity serialization method described by U.S. Pat. No. 7,827,200 would result in each supplier having to allocate blocks of serialized numbers to each retailer, each retailer's distribution center, and each retailer's store either in advance or in real time. In a strict pure-identity-managed system that approach is indeed required, but does not scale globally nor operate efficiently. The present invention, by managing the uniqueness of EPC binary encodings circumvents this problem by allowing the retailer to designate an unused or unconventional partition value to create a separately managed numbering space that is independent from the space that would be managed by the pure identity approach. The supplier would for example use PV=x, while each retailer that they ship their goods to would use PV=y where y is not x. Although the resulting pure identity would be the same, the EPC binary encodings would be different. Therefore the prior art does not adequately solve real world serialization problems at the encoder level that are overcome by the present invention.

US Patent Application 2007/0229267 by Ken Traub also has the same problem by teaching a system that operates on pure identities, a solution that lacks the ability to operate properly when embedded within an RFID tag encoder.

US Patent Applications 2005/0253722 and 2005/0252970, U.S. Pat. No. 7,322,523, and U.S. Pat. No. 7,336,175 all similarly describe a network-based tag provisioning system that uses a MAC address and/or DHCP to create unique EPC codes. Such a system incurs non-deterministic delays and is not suitable for embedding within an RFID encoder where the operator depends on maintaining a regular and predictable cadence in the tag commissioning process.

So, despite recent advances in RFID technology, the state-of-the-art does not fully address the needs of simple, efficient, economical, high-volume, reliable deployment and commissioning of RFID transponders and wireless sensors. Large-scale adoption of RFID transponders depends on systems utilizing reliable, low-cost transponders deployed at thousands of distributed locations that implement simple and efficient manual transponder commissioning means. Such systems should further include processes for efficient commissioning of batches of RFID transponders, without the need for realtime wireless connectivity.

SUMMARY OF THE INVENTION

The present invention overcomes the shortcomings of the prior-art attempts and, accordingly, provides systems, methods, and devices that commission RFID transponders on-demand and at a point-of-use utilizing wireless data transfer in a compact package that is well-suited to portable, mobile, or fixed use in multiple applications. The present invention is used for reading data from or encoding data onto wireless transponder data carriers with no external authorizations or queries required on a transponder-by-transponder basis. Additionally this invention teaches a preferred method and apparatus for commissioning RFID transponders without requiring continuous use of a screen or keypad to control operations. Further advantages of the present invention will be well-appreciated by those skilled in the art upon reading this disclosure including the appended figures of the drawing.

Authorizations for one or more classes of objects are preferably loaded into the encoder; where such authorizations include data fields such as manufacturer ID, item reference, manufacturer code lengths, filter values (that designate packaging levels such as item, case, pallet, etc.), serial number starting point for a block, and other pre-determined parameters. Such information is preferably loaded into the memory of the encoder in advance of tag commissioning operations. Thus if loaded with information for more than one object class, the encoder does not have sufficient information to proceed with encoding a transponder until a single object class is selected for the present RFID transponder to receive; an ambiguity therefore exists that is preferably resolved with information entered by an operator using either a keypad or a bar code scanner. Reading printed indicia such as a bar code is a preferred method to resolve the ambiguity as to which object class the next RFID transponder is to receive a number from. Bar codes are used to eliminate errors and ambiguities that enable the encoder to locally generate or replicate data for encoding into a data carrier such as an RFID transponder.

This type of data production and/or replication process is very fast and efficient. There is no absolute need to query a database in real time; hence there is no need for continuous wireless network connectivity. This simplification eliminates the possibilities for non-deterministic network delays. Non-deterministic delays are delays that cannot be guaranteed, usually due to the probabilistic nature of packet collisions that are common in Ethernet and WiFi. By eliminating the need to access a network database, the variable non-deterministic delays caused by changing database sizes, changing record counts, and database user load fluctuations are completely circumvented. Reduction or outright elimination of non-deterministic delays helps manual labor operate at maximum efficiency, allowing them to achieve a regular and dependable cadence in their transponder application processes.

For example, in one embodiment the present invention consists of an encoder for commissioning RFID transponders. The encoder consists of an RFID interrogator module adapted to enable encoding predetermined data according to a commissioning algorithm and communicating with an internal antenna, the antenna being adapted to encode the predetermined data on the RFID transponder; a memory storage device for storing at least a portion of the predetermined data; a processing means for controlling and communicating with the memory storage device, the RFID interrogator and the internal antenna; a means for providing a supply of RFID transponders, the transponders configured for tensile extraction from the encoder or, preferably from means for providing a supply of RFID transponders comprising a cartridge; and a means for presenting the RFID transponder within an operable range of the internal antenna or near field coupler to enable encoding of the predetermined data.

In further embodiments, the present invention includes a method for commissioning RFID transponders comprising: providing a roll or sheet of RFID transponders; providing a cartridge or other pre-packaged self-contained supply of RFID transponders; providing an encoder; inserting the roll or sheet in the cartridge or other pre-packaged self-contained supply of RFID transponders; coupling the cartridge to the encoder; acquiring information to encode from printed indicia; encoding the information on at least one RFID transponder; and adapting the process of attachment of the encoded transponder to the target surface along a vector that is nearly parallel to the target surface based upon real time feedback from the surrounding environment.

DRAWING

DESCRIPTION OF THE INVENTION

Figure 1:
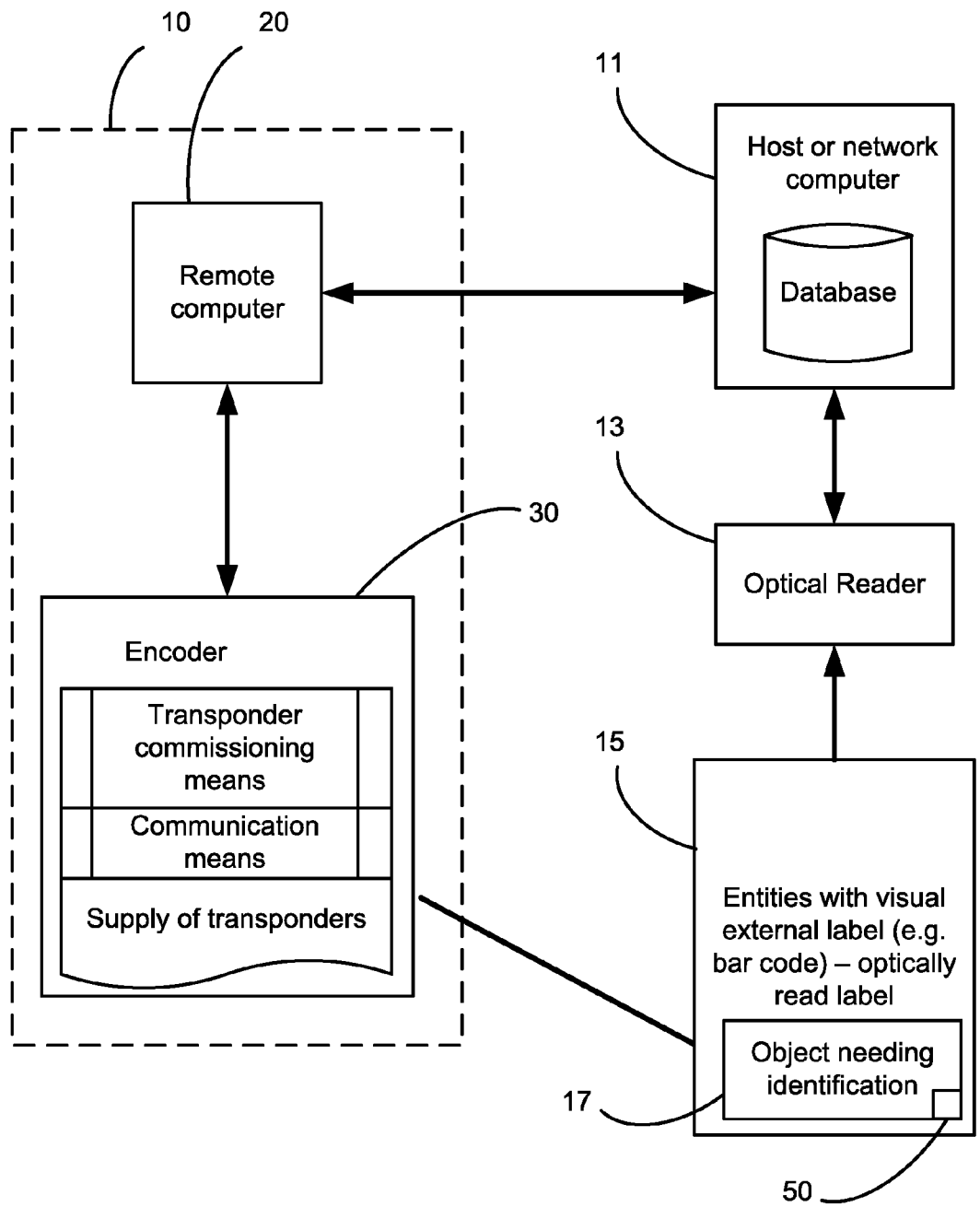
FIG. 1 is a block diagram of the system and environment according to one embodiment of the present invention.

Making reference to various figures of the drawing, possible embodiments of the present invention are described and those skilled in the art will understand that alternative configurations and combinations of components may be substituted without subtracting from the invention. Also, in some figures certain components are omitted to more clearly illustrate the invention. In some figures similar features share common reference numbers.

To clarify certain aspects of the present invention, certain embodiments are described in a possible environment—as identification means for containers. In these instances, certain methods make reference to containers such as loaded pallets, paperboard boxes, corrugated cartons, pharmaceutical containers, and conveyable cases, but other containers may be used by these methods. Certain embodiments of the present invention are directed for use with steel drums, commercial corrugated shipping cartons, tagged pallet-loads of shrink-wrapped cases, consumer-goods packaging, consumer goods, automobile windshields, industrial components, or other methods of identifying objects using RFID transponders or wireless sensors, or both. In certain embodiments the target surface to which a transponder will be attached is a container. In some applications the target surface is moving while the encoder device is stationary. Furthermore the moving target surface may be objects on a conveyor. In yet other embodiments the target surface may be a web of release liner from which encoded transponders will be later removed and applied to an object for identification.

Some terms are used interchangeably as a convenience and, accordingly, are not intended as a limitation. For example, transponders is a term for wireless sensors that is often used interchangeably with the term tags and the term inlay, which is used interchangeably with inlet. This document generally uses the term tag or RF tag to refer to passive inlay transponders, which do not include a battery, but include an antenna structure coupled to an RFID chip to form an inlay which is generally thin and flat and substantially co-planar and may be constructed on top of a layer of foam standoff, a dielectric material, or a folded substrate. One common type of passive inlay transponder further includes a pressure-sensitive adhesive backing positioned opposite an inlay carrier layer. However, certain aspects of the present invention work equally well with active inlay transponders. A third type: a battery-assist tag is a hybrid RFID transponder that uses a battery to power the RFID chip and a backscatter return link to the interrogator. Further, this document uses programmable RFID transponders interchangeably with RFID transponders. Programmable transponders enable data to be written or stored more than once.

Suitable environments or applications for certain aspects of the present invention include: traditional conveyor line or other high-speed machinery with automated transponder printing, encoding, and attachment; hand attachment of transponders (a method that often is referred to as "slap and ship"); and a novel category of mobile transponder encoders (as will be more fully described herein); shipside receiving of automobiles; case picking operations that include selective tagging process steps; and receiving untagged cartons into an RFID-enabled retail store or a manufacturing plant.

The systems, methods, and devices of the present invention utilize an RFID transponder or wireless sensors as a component. Certain RFID transponders and wireless sensors operate at Low Frequencies (LF), High Frequencies (HF), Ultra High Frequencies (UHF), and microwave frequencies. HF is the band of the electromagnetic spectrum that is centered around 13.56 MHz. UHF for RFID applications spans globally from about 860 MHz to 960 MHz. Transponders and tags responsive to these frequency bands generally have some form of antenna. For LF or HF there is typically an inductive loop. For UHF there is often an inductive element and one or more dipoles or a microstrip patch or other microstrip elements in their antenna structure. Such RFID transponders and wireless sensors utilize any range of possible modulation schemes including: amplitude modulation, amplitude shift keying (ASK), double-sideband ASK, phase-shift keying, phase-reversal ASK, frequency-shift keying (FSK), phase jitter modulation, time-division multiplexing (TDM), or Ultra Wide Band (UWB) method of transmitting radio pulses across a very wide spectrum of frequencies spanning several gigahertz of bandwidth. Modulation techniques may also include the use of Orthogonal Frequency Division Multiplexing (OFDM) to derive superior data encoding and data recovery from low power radio signals. OFDM and UWB provide a robust radio link in RF noisy or multi-path environments and improved performance through and around RF absorbing or reflecting materials compared to narrowband, spread spectrum, or frequency-hopping radio systems. Wireless sensors are reused according to certain methods disclosed herein. UWB wireless sensors may be combined with narrowband, spread spectrum, or frequency-hopping inlays or wireless sensors.

A. System and Encoder Overview

Referring to FIG. 1 the present invention includes a system for commissioning wireless sensors at a point of use and on-demand. For example, in one embodiment, the present invention incorporates a mobile encoder device 30, which may be attached to a belt of an operator and powered by rechargeable batteries 60. The mobile encoder is in wireless communication with a remotely located host computer. The operator can selectively (on-demand) enable the mobile encoder to commission a transponder based on various criteria, including input received from a mobile bar code scanner, for example.

FIG. 1 shows one system 10 according to the present invention in a typical environment, such as a packaging facility wherein a collection of entities with visual external labels 15 exist and a sub-set (or all entities) need to be associated with a wireless RFID transponder, tag, or label. The object 17 needing an RFID transponder could be a packing container having an assorted collection of entities 15. As entities 15 are pulled from collection 176, a traditional optical reader 13 (human or machine) interprets the visual external label. Information from the external, visual label is correlated to information stored in a centralized location, represented by a network computer 11 having a database. The information taken by the optical reader 13 is transmitted to the network computer 11. System 10 includes a wireless connection between the remote computer 20 and the mobile encoder 30 either directly or through a common wireless access point. Additionally, a wireless connection could occur between the remote computer 20 and the host computer 11, and in this embodiment, the remote computer 20 is in physical connection with the mobile encoder. In yet another embodiment, the remote computer 20 wirelessly connects to both the mobile encoder 30 and the host computer 11. Optionally, the optical reader 13 can be incorporated in the encoder 30.

Figure 3:
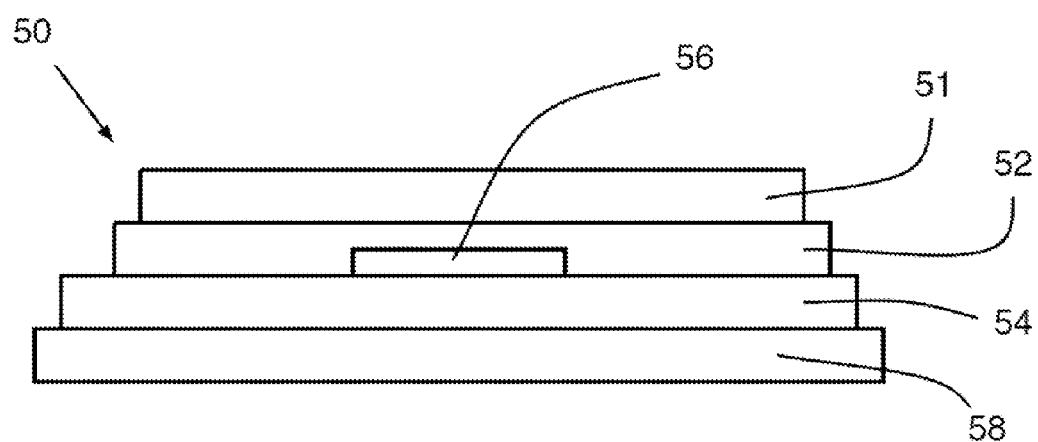
FIG. 3 is a schematic end-view of the RFID transponder of FIG. 2.
Figure 4:
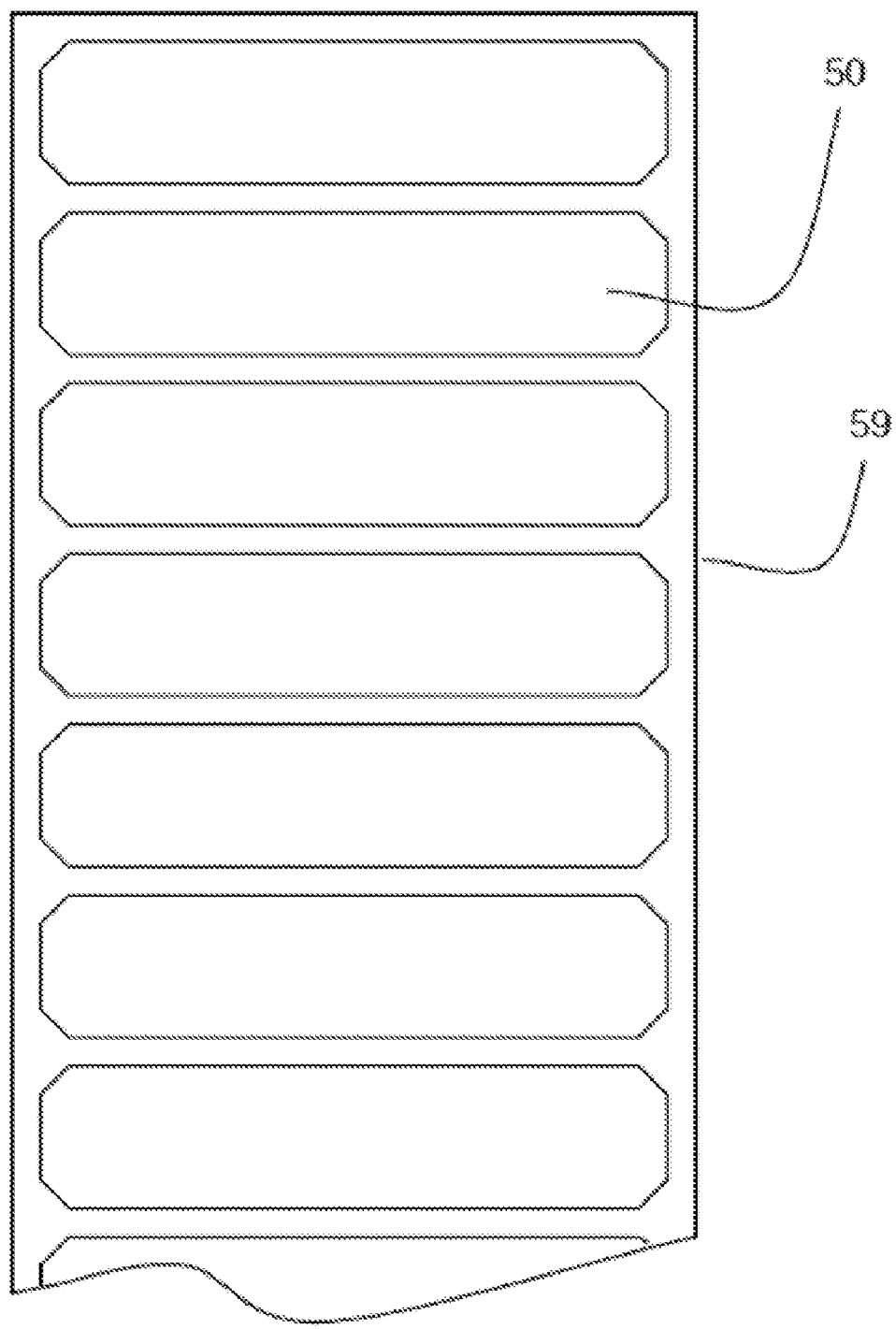
FIG. 4 is a top view schematic drawing of a sheet or roll of a plurality of RFID transponders of FIG. 3.

Referring to FIGS. 3 and 4, in further embodiments, the present invention incorporates a mobile encoder device 175, 30, or 220 which may be held in the hand of an operator. Mobile encoder device 175, 30, or 220 is preferably powered by rechargeable batteries or a fuel cell. System 170 includes at least four possible intermittently connected entities if they are present and connected: mobile encoder 175, remote computer or mobile phone 172, optical reader 173, and headset 174. A preferred short range wireless connection means 175A such as a WLAN (Wireless Local Area Network) or PAN (Personal Area Network) may be established from time to time between mobile encoder 175 and remote computer or mobile phone 172, optical reader 173, and/or headset 174. There is a preference for low power wireless connection apparatus within mobile encoder 175 so as to realize the greatest possible battery life in light weight mobile encoder 175. Mobile encoder 175, 30, or 220 is in intermittent wireless communication with a mobile phone or computer 172 typically at close range through wireless communication means 175A. Database and associated host computer 171 may be housed at a remotely located facility that may optionally be accessed over a large distance through remote computer or mobile phone 172. A mobile phone is a preferred bridge between two or more wireless networks, for example a PAN and a wireless subscriber network that supports wireless data services for ultra mobile and remote tagging applications. Continuous wireless connection to a host database is not required for ongoing tag commissioning process steps disclosed herein.

RFID tags such as those using EPCglobal numbers requires uniqueness of the numbers that are encoded. GS1 is a central authority that prescribes a set of hierarchies for each key type (type of identity such as an SGTIN) whereby GS1 designates itself as the central issuing authority for each key type. Authority is passed down in a hierarchical manner to member companies. Each member company has the authority to further allocate numbers from its upper level database to as many lower database levels as it deems necessary to distribute number authority throughout its enterprise.

Quasi-autonomous RFID transponder encoding authority is achieved when an external number issuance authority allocates to the encoder blocks of numbers for specific object classes. A preferred embodiment for quasi-autonomous transponder encoding authority is realized when large pre-authorized blocks of serial numbers are made available to encoder 175 or 30 to utilize on object classes as objects of a class are presented for tagging. A preferred method of providing pre-authorized blocks of object class serial numbers is to subdivide the entire object class serial number space into sectors that are defined by a limited number of MSB's (Most Significant Bits) of the serial number field. The object class serial number space is defined by the number of serial number bits that are used in a specific standard, such as a particular EPCglobal key type, for example an SGTIN-96 and is defined in a corresponding specification such as the GS1 EPCglobal EPC Tag Data Standard. Again using the SGTIN-96 as an example, there are a total of 38 bits used to define the entire serial number space which contains $2^{38}$ unique numbers. For example the upper 14 bits could be designated as the most significant bits for a particular embodiment. In that case the object class serial number space would be comprised of 16,384 sectors. Since in this example there are 14 most significant bits within a 38 bit serial number field, there must be 38 minus 14 bits of lesser significance, which equals 24 bits. Therefore the lower 24 bits represent 16,777,216 unique serial number values. Once a sector is allocated to a lower level within an authority hierarchy, it is referred to as a block. Each allocated block of serial numbers represents authority for encoding objects of an object class that can either be used by an encoder for encoding transponders, or allocated to a lower level in the authority hierarchy.

In a preferred embodiment serial number block sizes are sufficient to operate encoder 175 or 30 for extended periods of time without any further external authorization steps. For example autonomous operation for a week or more is possible with sufficiently large block sizes. In the previous example the encoder could encode over 16 million objects of an object class without the need to reconnect with a higher level authority. If 10,000 objects of an object class are encoded each day, then the encoder could operate in a quasi-autonomous mode for up to 1677 days or over four years without receiving further authorizations from a higher level authority. Block allocations are preferably assigned with reference to how many encoders 175 or 30 are authorized to operate within the facilities of the owner of certain object class numbers.

Authorizations for one or more classes of objects are preferably loaded into encoder 175, 30, or 220 from an external authority where such authorizations include data fields such as manufacturer ID, item reference, manufacturer code lengths, filter values (that designate packaging levels such as item, case, pallet, etc.), serial number starting point for a block, and other pre-determined parameters. Such information is preferably loaded into the memory of the encoder in advance of tag commissioning operations. Thus if loaded with information for more than one object class, encoder 175, 30, or 220 does not have sufficient information to proceed with encoding a transponder until a single object class is selected for the present RFID transponder to receive; an ambiguity therefore exists that is preferably resolved with information entered by an operator using either a keypad or a bar code scanner. Reading printed indicia such as a bar code is a preferred method to resolve the ambiguity as to which object class the next RFID transponder is to receive a number from. Bar codes are used to eliminate errors and ambiguities that enable encoder 175, 30, or 220 to locally generate or replicate data for encoding into a data carrier such as an RFID transponder.

GS1 is a leading global organization dedicated to the design and implementation of global standards and solutions to improve the efficiency and visibility of supply and demand chains. GS1 defines EPCglobal SGTIN number fields as having a company prefix, an item reference, a partition value, and a filter value that comprise the object class information. A unique serial number is then added to that information to create each unique instance within each object class.

In a preferred embodiment, a block is allocated and managed using three numbers: a starting number that is the first serialized instance of a block, a block size which represents the total number of instances in the block, and a counter or index that represents how much of the block has been used during an encoding process. Using these three numbers and an optional lock bit, a simple database of object class authorizations can be built.

A preferred embodiment utilizes RFID authorization transponder 178A and a printed substrate 178B to physically handle object class serial number issuance authorizations. Authorization transponder 178A is interrogated by transponder reading/encoding means 175H. Preferred embodiments use the 96-bit EPC memory bank for specifying the block starting number, including the company prefix, item reference, partition value, filter value, and base serial number. The User Memory bank is used to hold and transfer the block size (preferably 16-bits), counter or index value (preferably 16-bits), a 16-bit header to identify the transponder as a valid member of a class of authorization transponder, a lock bit, and a CRC value to detect errors in all of the data fields. For example a CRC error would detect errors in storage, transponder selection, or data transmission. In preferred embodiments reading of data blocks from more than one RFID transponder would be avoided by selecting a transponder, checking that it is the correct type, contains valid authorization data, contains a valid header that signifies that it is an RFID authorization transponder 178A, and that all data read correctly verifies with a dedicated error detection field such as a CRC.

RFID authorization transponder 178A is preferably adhered to printed substrate 178B so that an operator can visually identify what object class or SKU is managed by the affixed authorization transponder 178A. A picture, icon, bar code, or human readable symbols are all useful for identifying the object class. An operator presses a button or scans a bar code that prompts encoder 175 to read and store the tagging authorization held by authorization transponder 178A. Once read, authorization transponder 178A is preferably electronically marked as 'consumed' or 'locked' by transponder encoding means 175H. EPC transponder ID fields that identify a specific type of chip are preferred for selecting the proper transponder, even when other RFID transponders are within range of the antenna or near field coupler of transponder encoding means 175H.

A collection of authorization transponders 178A comprises a database that can be physically transported without the need for a wireless communications link to encoder 175. Once read, database records are preferably stored in internal memory means 175G. In a preferred embodiment 12 to 14 bytes of Flash memory is used for each record to allocate 250 to 65536 instances of an object class, whereby the first byte of an EPC number is a fixed header value can be replaced in Flash memory by 8 bits of the allowable block size. One or two bytes in RAM are used to count or index through the block allocation as it is used. Thousands of data records of this type can easily fit into the memory space of an economical 8-bit microcontroller. In a preferred embodiment, where the GS1 SGTIN-96 header is replaced in memory with an 8-bit block size authorization, 300 records for authorizing up to 255 instances per record, can be used to safely manage at least 500,000 tagging records using 24,000 bytes of Flash memory and 2000 bytes of RAM. Other embodiments using more bits to authorize and control larger blocks of numbers is possible at a slightly larger expense of memory.

Preferred embodiments of encoder 175, 30, or 220 will encode all of the GS1 identity types. Such types include the General Identifier (GID-96), Serialized Global Trade Item Number (SGTIN), Serial Shipping Container Code (SSCC), Serialized Global Location Number (SGLN), Global Returnable Asset Identifier (GRAI), and the Global Individual Asset Identifier (GIAI). Other preferred embodiments are used to encode numbers that are a part of other numbering systems.

Data records are preferably loaded and stored through commands that are transmitted over wireless communication means 175A. In preferred embodiments, batch mode commands can be used in any of three ways: (1) to immediately affect the current operation by starting a batch tagging process for a specified SKU or object class; (2) to store authorizations in memory means 175G; and (3) to store authorizations in stored-value RFID transponder 178A.

When external connection is necessary, wired or wireless communication with an external host or numbering authority is established. Wireless communication means 175A is preferably a Wi-Fi or Bluetooth connection. A wireless node of a Bluetooth personal area network is used according one embodiment of the present invention. Model 100-SER manufactured by EmbeddedBlue of Poway, Calif. and the BISMS02 from EZURiO Ltd., a subsidiary of Laird Technologies, Inc. of Chesterfield, Mo. are examples of preferred OEM Serial Bluetooth modules. Other wireless interfaces may alternatively be used to achieve Serial Port Profile and other types of connectivity between encoder 175 and remote computer or mobile phone 172 and/or optical reader 173.

Other preferred embodiments of mobile encoder 175 and system 170 replace wireless communication means 175A with a cable, resulting in an embodiment of mobile encoder 175 with a tethered bar code scanner. A key advantage of an alternative embodiment of system 170 that utilizes a wired connection to optical reader 173 instead of wireless communication means 175A is a very simple solution having virtual immunity to any surrounding RF interference that might raise the noise floor hindering wireless communications.

The operator can cause mobile encoder 175, 30, or 220 to commission a transponder by scanning certain printed bar code symbols received through optical reader 173 which is connected to encoder 175 through wireless communication means 175A. Or alternatively internal optical reader 175F is used to scan printed bar code symbols. In either case data from optical reader 173 or 175F is delivered to processing means 175B. Certain preferred embodiments of system 170 use optical scanners with self-contained symbol decoding capabilities to deliver decoded symbol information to processing means 175B. Certain other embodiments of system 170 relies on processing means 175B to conduct some or all decoding operations to derive information from scanned symbols.

The information derived from the optical reader 173 or 175F is used by mobile encoder 175 to either directly or indirectly encode data into RF transponder 178 while it is still physically within mobile encoder 175. Mobile encoder 30 uses external optical reader 173, and alternatively mobile encoder 220 uses internal optical reader 175F, as embodied in reader 226 of FIG. 21. Preferred embodiments of optical reader 226 are mechanically aligned relative to transponder encoding means 175H or more specifically with the antenna or near field coupler of RFID interrogator 224A. Spatial alignment assures that an operator will be able to comfortably scan bar codes and then encode and apply RFID transponders along a line of movement such that the operator can easily assure proper placement of encoded transponders.

Figure 22:
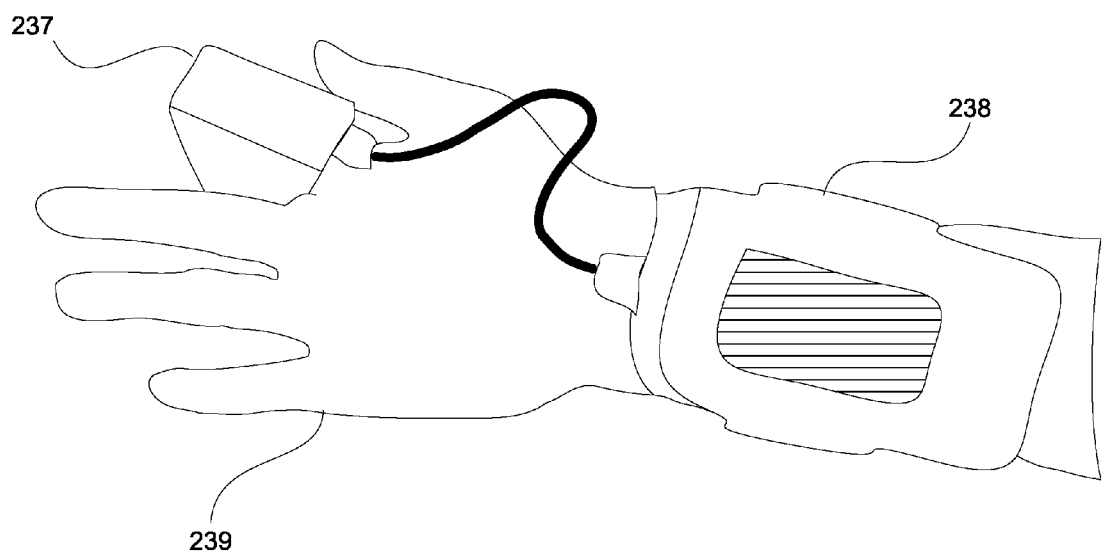
FIG. 22 is a diagram of a wearable wireless bar code scanner according to one embodiment of the present invention.

Symbol decoding functions may be physically, electrically, or logically separated from symbol scanning operations. One preferred embodiment of optical reader 173 is a model CHS-7M, CHS-7P, CRS-9M or CRS-9P Bluetooth ring scanner 237 shown in FIG. 22 all manufactured by Socket Communications of Newark, Calif. Ring scanner 237 if not completely self-contained with battery and wireless connection is, in a preferred embodiment tethered to a battery pack and wireless interface 238 strapped to the arm 239 of an operator. Certain preferred embodiments designate ring scanner 237 as the master node of a Bluetooth network. As a master, ring scanner 237 will preferably pair with a specific mobile encoder designated by a unique identifier that is also encoded onto a bar code affixed to the external housing of mobile encoder 175. Ring scanner 237 is used to scan that bar code and decode it to acquire the unique 12-hexadecimal digit Bluetooth address to perform a Bluetooth pairing operation that results in mobile encoder 175 becoming a slave on that network. Then whenever a bar code 179 is scanned, the Bluetooth-paired instance of mobile encoder 175 is notified of the new bar code data to support RFID transponder encoding operations or command inputs.

Processing scanned commands involves a processing step to determine that a bar code should be interpreted as a command or configuration instructions rather than as bar code 179 that identifies an object that is to be tagged. Commands are used to alter the flow and operation of mobile encoder 175.

Figure 17:
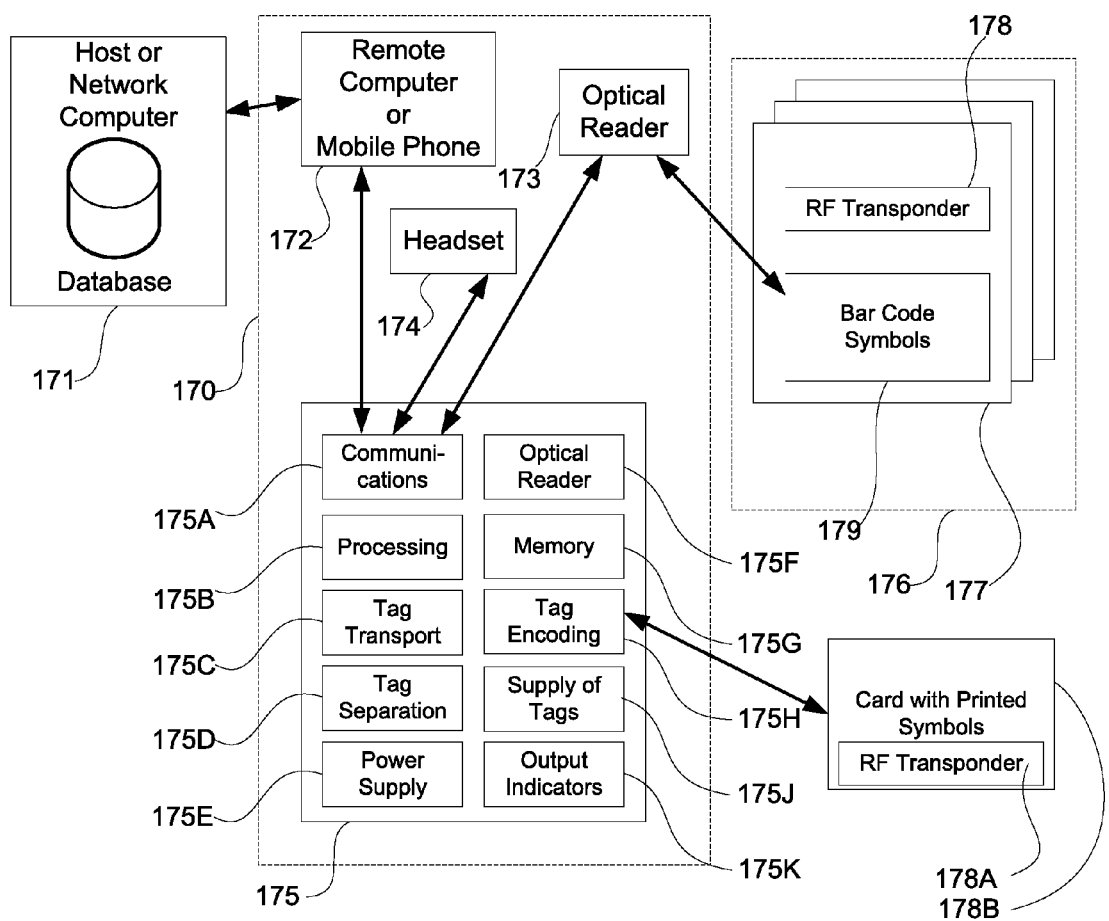
FIG. 17 is a block diagram of the system and environment according to one embodiment of the present invention.
Figure 21:
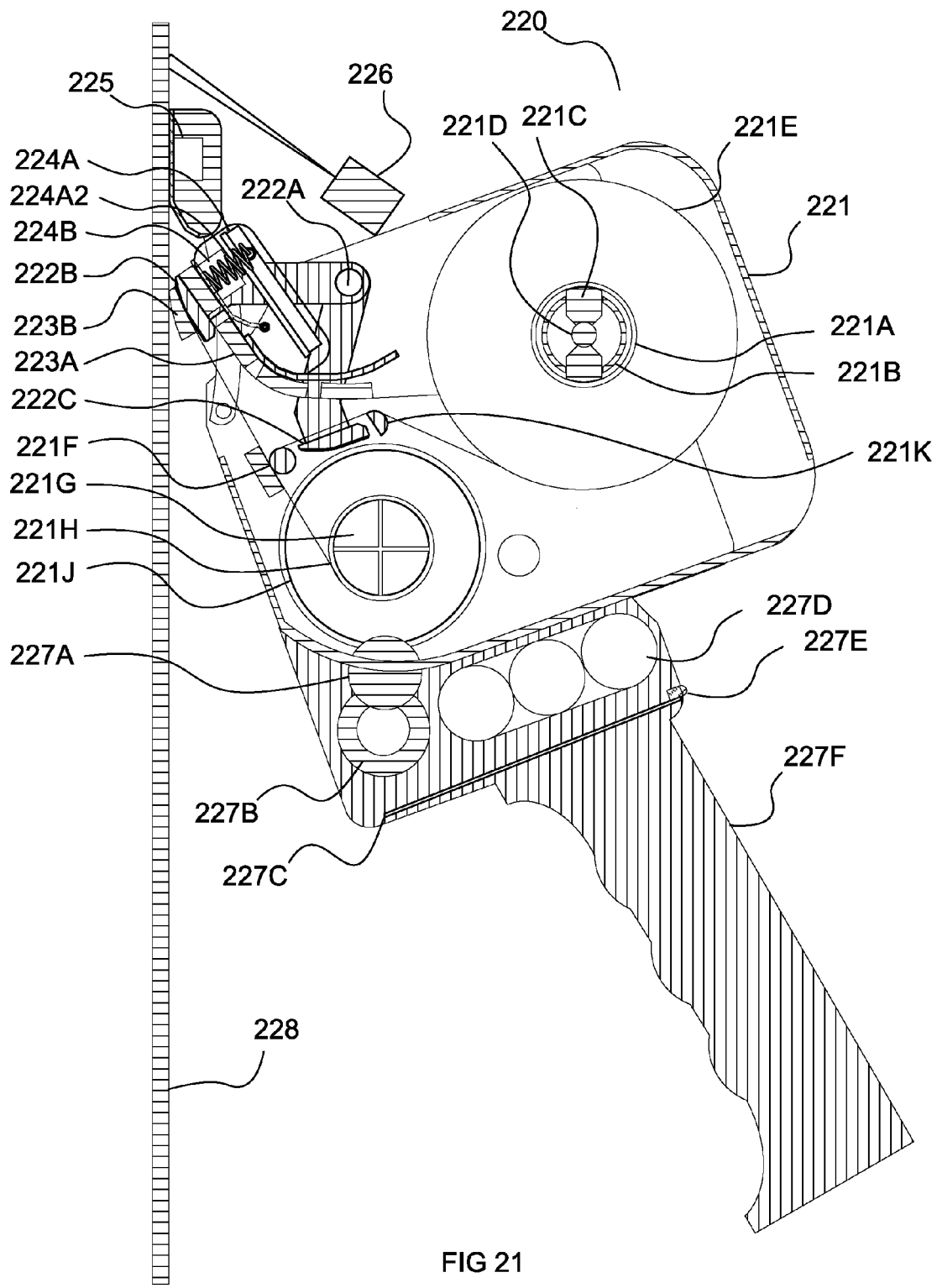
FIG. 21 is a side view of a handheld mobile encoder with an integrated bar code scanner according to one embodiment of the present invention.

FIG. 21 is a preferred embodiment of a mobile encoder wherein optical reader 226 is an OEM bar code scanner manufactured by such companies as Intermec or Motorola and is a preferred embodiment of optional internal optical reader 175F shown in FIG. 17.

In a preferred embodiment one or more bar codes are pre-printed and applied as symbol 179 on entity 177 in a manufacturing facility or other suitable location. Such bar codes are described in ISO/IEC draft document PDTR 24729-1 and are more generally referred to as one or more bar codes having Application Identifiers (AI) 01 and 21 encoded into them, and preferably include header information and other control bits that are required for certain protocols. AI 01 is used to represent the Stock Keeping Unit (SKU) as a GS1 Global Trade Item Number (GTIN). AI 21 is used to serialize the SKU. Together the two AI's are used to specify a GS1 serialized GTIN (SGTIN). Bar codes can also be used to specify data payloads that use numbering systems other than the EPC numbering system. The Application Family Identifier (AFI) also plays an important role in designating alternative numbering authorities.

Figure 23:
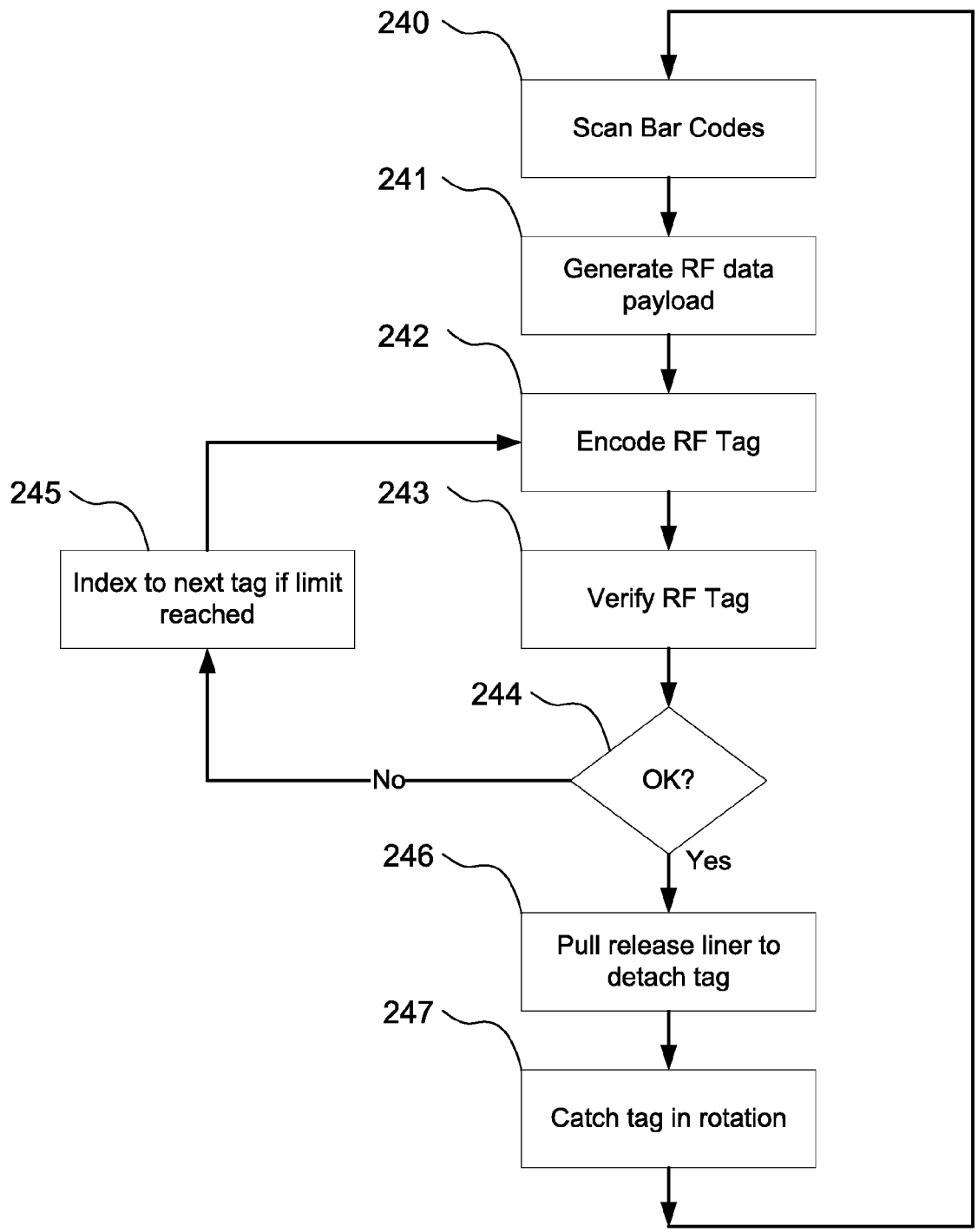
FIG. 23 is a flow chart of a first method according to the present invention.

This preferred method that is described by the flow chart in FIG. 23 will allow batch mode operation where there are at best intermittent connections with remote computer 172. This preferred method allows existing label application and/or printing hardware located on existing manufacturing lines to provide in printed symbolic form all data that would be encoded into an RF transponder. By providing printed symbols, manufacturers do not have to incur either the cost of that transponder or the special equipment that is required to encode and apply RF transponders.

Optical reader 173 or 226 is described above and is used as the primary source of real time data input for the mobile encoding system that uses an embodiment such as mobile encoder 30 or 220. Optical reader 173 or 226 is also preferably used to scan special bar codes that instruct mobile encoder 175, 30, or 220 to perform certain prescribed functions which will be described below.

Certain preferred embodiments of system 170 include headset 174 which may be a headset worn by the operator or a Bluetooth-linked loud speaker that is mounted to a pallet jack or fork lift truck. Headset 174 is optionally used by system 170 to give instructions, confirmation signals, or warnings to the operator. Synthesized speech or audible tones are used to interact with the operator through headset 174.

In these aforementioned embodiments, the mobile encoder 30 is a portable device that can be easily mounted in a fixed location, carried such as mobile encoder 220, or worn by a human operator such as mobile encoder 30, or hung from a suspended retractable tool cable. As such, the mobile encoder 30 includes an internal power source 175E such as a rechargeable lithium-ion battery and would further include a handle or a belt-clip for ease of use. In another embodiment, the mobile encoder can be attached to a high-speed conveyor line. In such an application, the on-board battery could be replaced or augmented by a physical connection to a remote power source. Further, the computer 20 could have wired connects to the host network 11. Further details of possible configurations of the mobile encoder will be further detailed in subsequent sections of this disclosure.

Figure 20:
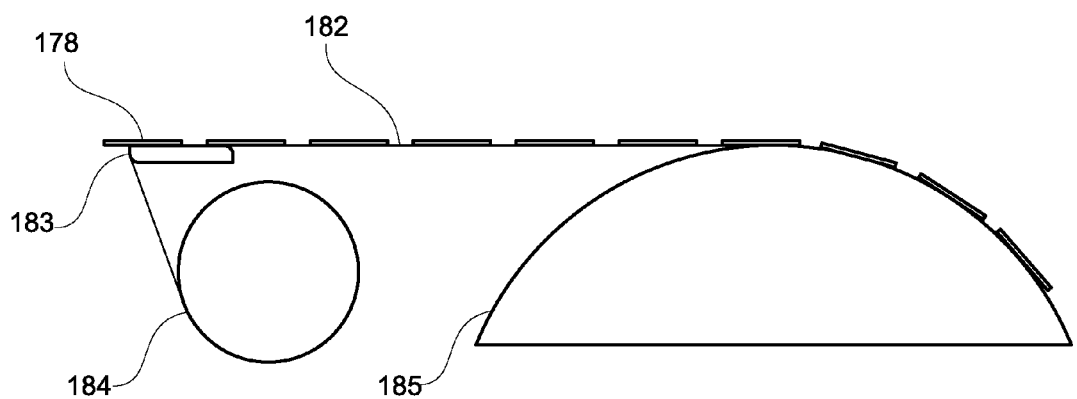
FIG. 20 is a side view of a web of release liner containing RFID transponders, provided on a source roll, stretched tight around a peel device, and advanced forward onto a take-up reel according to one embodiment of the present invention.

In the system 10 of FIG. 1, the mobile encoder 30 carries a supply of un-commissioned (or blank), or securely encodable RFID transponders 175J, 185, 42, or 221E. Once the desired data is accumulated and presented to the encoder 30 from the computer 20, the encoder commissions an RFID transponder, using transponder transport means 175C and transponder encoding means 175H and any one of several preferred encoding algorithms to program, creating an RFID tag or label 50 for the object 177. Transponder separation means 175D is used to separate a properly encoded transponder 178 from release liner conveyance web 182 by breaking the bond at adhesive layer 181D on the leading edge of transponder 178. Transponder separation means 175D is preferably a peel device 183 as shown in FIG. 20 or peel device 222B in mobile encoder 220. Peel devices 183 or 222B are preferably made from anti-static plastic, metal, or other material that will conduct electrostatic charge away from transponder 178 and release liner 182. The commissioned tag or label 50 can then be applied, linked, or otherwise associated with the object by known means including a human operator or a machine transfer.

B. RFID Transponders

Figure 2:
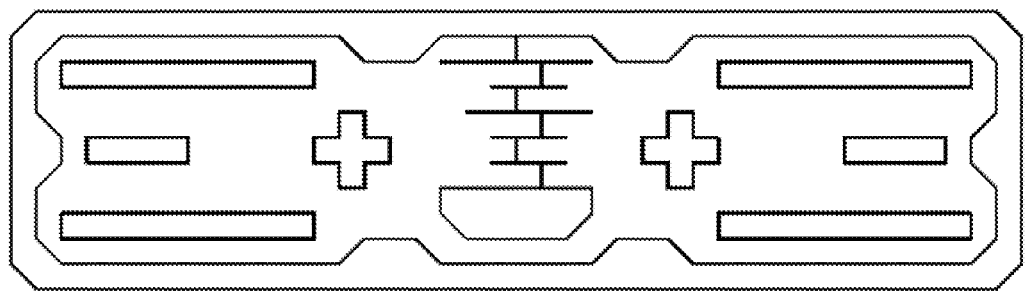
FIG. 2 is a top view of a possible RFID transponder according to one embodiment of the present invention.
Figure 18:
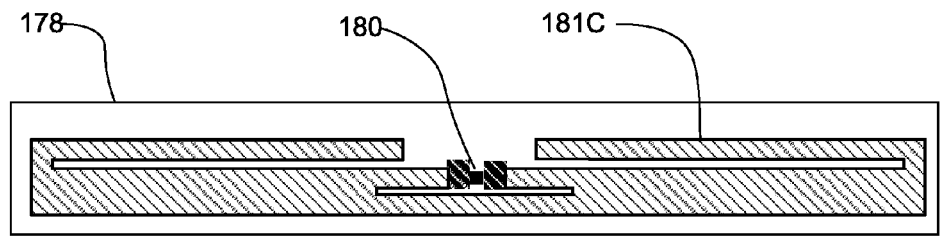
FIG. 18 is a top view of a possible RFID transponder according to one embodiment of the present invention.
Figure 19:
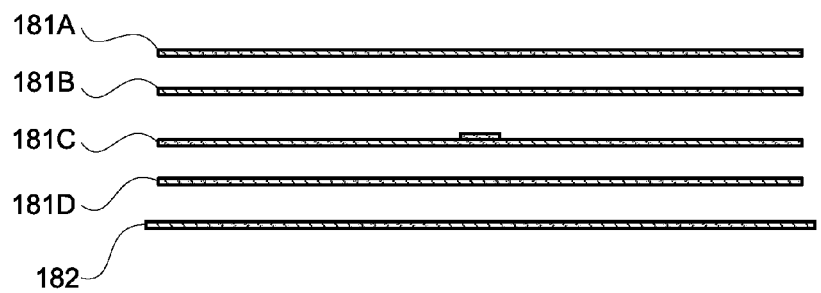
FIG. 19 is a material stack specification of an RFID transponder according to one embodiment of the present invention.

FIG. 2 shows a preferred embodiment of an RFID transponder 50. RFID transponders, in some embodiments, comprise an RFID integrated circuit (IC) device (or "chip") 56 of FIG. 3 or 180 of FIG. 18 bonded to an antenna apparatus, formed on a substrate that is often plastic such as Mylar®, polyester, or PET. One way to form an antenna structure is to etch copper from a substrate. An alternate printed transponder includes printing multiple layers of conductive ink onto a substrate. One additional method includes stamping UHF antennae from thin sheets of aluminum, or by selective aluminum deposition onto a substrate. In certain embodiments, RFID transponders and wireless sensors are recovered from waste streams for reconditioning, reprogramming, and reuse.

Other suitable RFID transponders include designs that combine a dielectric spacer behind the antenna by separating the metallic antenna inlay 181C from surrounding metals that may detune it, or liquids that may absorb RF energy from it. The dielectric spacer creates a transponder that performs well over a broad range of packaging conditions. The dielectric material is a foam standoff material or an expanding mechanical structure that provides lift from the target object and also a more robust design also includes features to protect the transponder from damage.

In certain embodiments, the RFID transponder is both programmable and mechanically configured for tensile extraction from a protective enclosure.

In preferred embodiments, hundreds or thousands of instances of RFID transponder 178 are manufactured on a continuous web of flexible material with a spatial separation between them, preferably at regular intervals. Certain preferred embodiments use adhesive-backed transponders 178 adhered to release liner 182 as shown in FIG. 20, while other embodiments use the transponder material as its own conveyance that is severed from the rest of the web at predetermined locations, preferably after encoding and verifying transponder 178 is properly functioning.

In preferred embodiments of the present invention, the face stock material has a physical outline that is not much larger than the physical outline of the inlay itself. This is in contrast to labels which can have at least twice the surface area of the inlay or a direct-printed antenna structure in order to provide space for printed information. By having a label outline that is so much larger than the inlay surface area, there are a many possible combinations of inlay placement within the boundaries of a large printable label. This creates a problem and a challenge for printer/encoders that have to find and locate an inlay before attempting to encode it. By contrast, the present invention uses the detectable optical characteristics of the tag's minimal physical outline to position the transponder for encoding. This transponder positioning method is superior and an improvement over prior art that uses printed label stock as a carrier for RFID inlays wherein the physical dimensions of printed labels are not in any way a reliable indication of the location of the RFID inlay within the label. This is another example of how demand label printing further complicates RFID transponder encoding.

In one embodiment that is an exception to the minimal outline transponder design and positioning method described above, transponders that have a very long physical shape can be used to create a loop to secure an encoded transponder to a tree, a bush, or the handle of a piece of luggage. Preferred embodiments of such transponders are folded or rolled in order to package them onto a dispensing roll or packaged into a magazine or cartridge in a fan fold pattern. The resulting bundle of back-and-forth 'Z' folded or fan folded face stock material results in a compact package that minimizes the amount of release liner that needs to be wasted for each tag. Each z-folded transponder is then easily encoded and dispensed from encoder 175, 30 or 220. Transponders that can be encoded, verified, dispensed, and unfolded are advantageously used in forestry, ornamental nurseries, and airline baggage tracking applications where manual tagging is required.

In another embodiment, transponder 178 is pushed out of encoder 175 instead of being pulled out through tensile extraction. A transport mechanism for pushing transponders utilizes a gripping method such as friction or teeth that penetrate the webbing. Although there is a risk of jamming or mutilating the webbing, the advantage is that there is no need for a release liner to pull the transponder supply through encoder 175 using tensile extraction. A preferred 'tractor feed' embodiment mitigates the risk of web mutilation by utilizing a regular pattern of precut holes along one or both edges of the webbing, into which cog members of a drive mechanism engage to advance the webbing. A tractor feed embodiment is part of Transponder Transport Means 175C of FIG. 17 whereby a motor and gear train delivers drive torque to the web through friction rollers, penetrating teeth, cogs, or other mechanical engagement means. In such an embodiment, the preferred transponder separation means is a web cutter that is used to separate encoded transponders from unencoded tags. A web cutter can be either active or passive, in other words cutting force can originate with a motorized mechanism or with an operator's handling during dispensing and transponder detachment. A row of plastic or metal saw teeth is a preferred embodiment of a passive transponder separation device.

In another preferred embodiment, transponder 178 is manufactured on a high speed press, a bar code is printed onto face stock of transponder 178 and information that is representative of that bar coded information is also encoded into microchip 180. Then encoder 30 or encoder 220 preferably read that information from RFID microchip 180 and associate it with a transponder commissioning process that may or may not include the programming of additional information into RFID microchip 180. This is a novel method of reading bar coded information on transponder 178 without using a bar code scanner to do so within encoder 30 or 220.

In one embodiment, additional transponder layers include a thin and flexible energy cell comprising two non-toxic, widely-available commodities: zinc and manganese dioxide. One suitable energy cell is developed by Power Paper Ltd. of 21 Yegia Kapayim Street, Kiryat Arye, Petah Tikva, P.O.B. 3353, ISRAEL 49130, and incorporates an innovative process that enables the printing of caseless, thin, flexible and environment-friendly energy cells on a polymer film substrate, by means of a simple mass-printing technology and proprietary inks. The cathode and anode layers are fabricated from proprietary ink-like materials that can be printed onto virtually any substrate, including specialty papers. The cathode and anode are produced as different mixes of ink, so that the combination of the two creates a 1.5-volt battery that is thin and flexible. Unlike conventional batteries, this type of power source does not require casing.

A top layer of an RFID transponder assembly optionally comprises a paper face-stock 181A, which is a very low-cost material but also is the least environmentally resilient. UVresistant plastic face-stock 181A generally provides the best survivability in outdoor and rough-service environments, and also provides the best protection for the RFID transponder assembly.

A bottom layer of pressure-sensitive adhesive (PSA) 181D often is used for attachment of transponders to objects and often is referred to as a wet inlay or a wet tag or a wet transponder because of adhesion layer 181B. Alternatively, a layer of clear, translucent, or opaque adhesive-backed film or tape is used to attach the transponder or wireless sensor to object or container. The tape, any thin, low cost, flexible material with a self-adhesive backing, such as a conventional packing tape, is well-suited for this method of attachment. The tape may be formed into various shapes to achieve the requirements of this method. Certain embodiments may use tape that is preprinted with certain logos, marks, symbols, bar codes, colors, and designs. Suitable adhesive-backed tape must not—or at least minimally—absorb radio frequencies within the range of frequencies used by the transponder or tag. The tape material, also, must not corrode the device or otherwise hamper its functionality.

Certain embodiments use a type of packing manufactured specifically for a given encoder. Packing tape can be single-coated pressure-sensitive adhesive tape or, alternatively, media constructed with multiple layers including a backing layer. Certain backing layers are constructed on a plastic film having one or more layers. Certain backing layers are made from plastic resins such as polypropylene (PP), polyethylene (PE), or copolymers of PP, PE, PVC, polyesters, or vinyl acetates. Certain embodiments of PP are mono-axially oriented polypropylene (MOPP), bi-axially oriented polypropylene (BOPP), or sequentially and bi-axially oriented polypropylene (SBOPP). Certain backing layers are biodegradable. Certain backing layers are coated with a pressure sensitive adhesive on one side and a low adhesion release coating on the other side to reduce the amount of power required for the encoder to unroll the tape for application.

FIG. 3 shows a possible embodiment of an RFID transponder 50 that does not include an encapsulation layer comprising a separate tape. In this example, an adhesive layer 52 bonds with antenna layer 54 that is bonded to inlay substrate layer 58 and integrated circuit 56. Inlay substrate layer 58 and face-stock layer 51 provide resistance against electrostatic discharge (ESD) into antenna layer 54 or chip 56.

Other constructions for RFID transponders include one or more additional layers of high-dielectric material that encapsulate or substantially cover the inlay. In general, the thicker the dielectric layer the higher the voltage must be to initiate a flow of electrons through a dielectric layer. This results in higher ESD voltage ratings. Also, it is well known to those skilled in the art that thicker dielectric layers between antenna layer 54 and any other metal or liquid also tends to reduce parasitic loading of the antenna whereby maintaining antenna tuning for proper coupling to interrogators within a specified UHF band. In such embodiments, the integrated circuit chip and antenna bond to an adhesive layer and are protected from a discharge path through the tape layer by its particular thickness of dielectric material. A second dielectric layer bonds to the inlay substrate by a second adhesive layer, so that a low voltage discharge path is nonexistent around the two layers of tape substrate.

In another possible embodiment of an RFID transponder, the inlay substrate provides a second layer of ESD resistance against a discharge path through an outward-facing tape layer and associated adhesive layer. This construction protects the antenna and chip from electrostatic discharge originating from any direction. The encapsulation tape layer bonds to the antenna and chip via an adhesive layer and provides no adhesive bond to the transport container when the transponder is commissioned, and therefore depends on separate adhesive zones to attach to the container of interest.

In another possible embodiment, an RFID transponder includes multiple layers of ESD resistant material. For example, an outer layer substrate bonds to an inner substrate by an intermediate adhesive layer. A second adhesive layer bonds with the chip and antenna. The inlay substrate faces inward and presses against a transport container when the transponder is commissioned.

The contemplated adhesives in the various RFID transponder embodiments create strong and permanent bonds between tapes and inlay layers over a certain practical range of operating temperatures.

Because RFID transponders are designed to adhere to a container, one face of an external layer includes a pressure-sensitive adhesive. This external adhesive, however, must not cause mechanisms associated with the commissioning devices to jam. To prevent unwanted sticking of the RFID transponder, a transport layer protects the sticky, external adhesive. The transport layer is either a release liner such as a silicone-treated paper liner or a net (or mesh) web. A net or mesh web offers two principal advantages: less weight and being recyclable or reusable. A comparison of the weight of a net with a higher percentage of open area to a typical sheet of release liner reveals that the netting is lighter for any given section of comparable size. Environmental problems of disposal of release liner are well known. Mesh or netting, comprised of recyclable resins, is recovered after each use so that the mesh or net can be either reused or recycled for its constituent materials.

In one possible embodiment the mesh or netting is made of plastic such as nylon, polypropylene, polyethylene, HDPE, Teflon, or other resins. In other embodiments the mesh or netting is fabricated from metal or carbon-impregnated plastic to provide a conductive path to bleed electric charge away from points of accumulation.

Other advantages of a net or mesh transport layer include a substantial percentage of the adhesive not in contact with anything during storage and commissioning. When stored in a roll, a small percentage of the adhesive layer makes contact with the backside of the roll through the openings in the mesh. Thus, a small amount of energy is required to unroll the spool during transponder commissioning, yet there exists a certain amount of adhesion to prevent a converted spool from unraveling.

In other possible embodiments, the RFID transponders can include a surface suitable for human or machine readable, visible, external markings including bar-code symbols or alpha-numeric sequences.

FIG. 4 shows another embodiment of RFID transponders 50 grouped on sheet stock 59 such as rolls or z-folded sheets that enables a plurality of transponders to be carried on a continuous web or traditional release liner. Other certain embodiments use transponders that are stacked and loaded into magazines for transport, handling, and automated dispensing. In certain embodiments, the magazines contain metallic shielding to protect transponders and inlays from electrostatic discharges (ESD).

Figure 10:
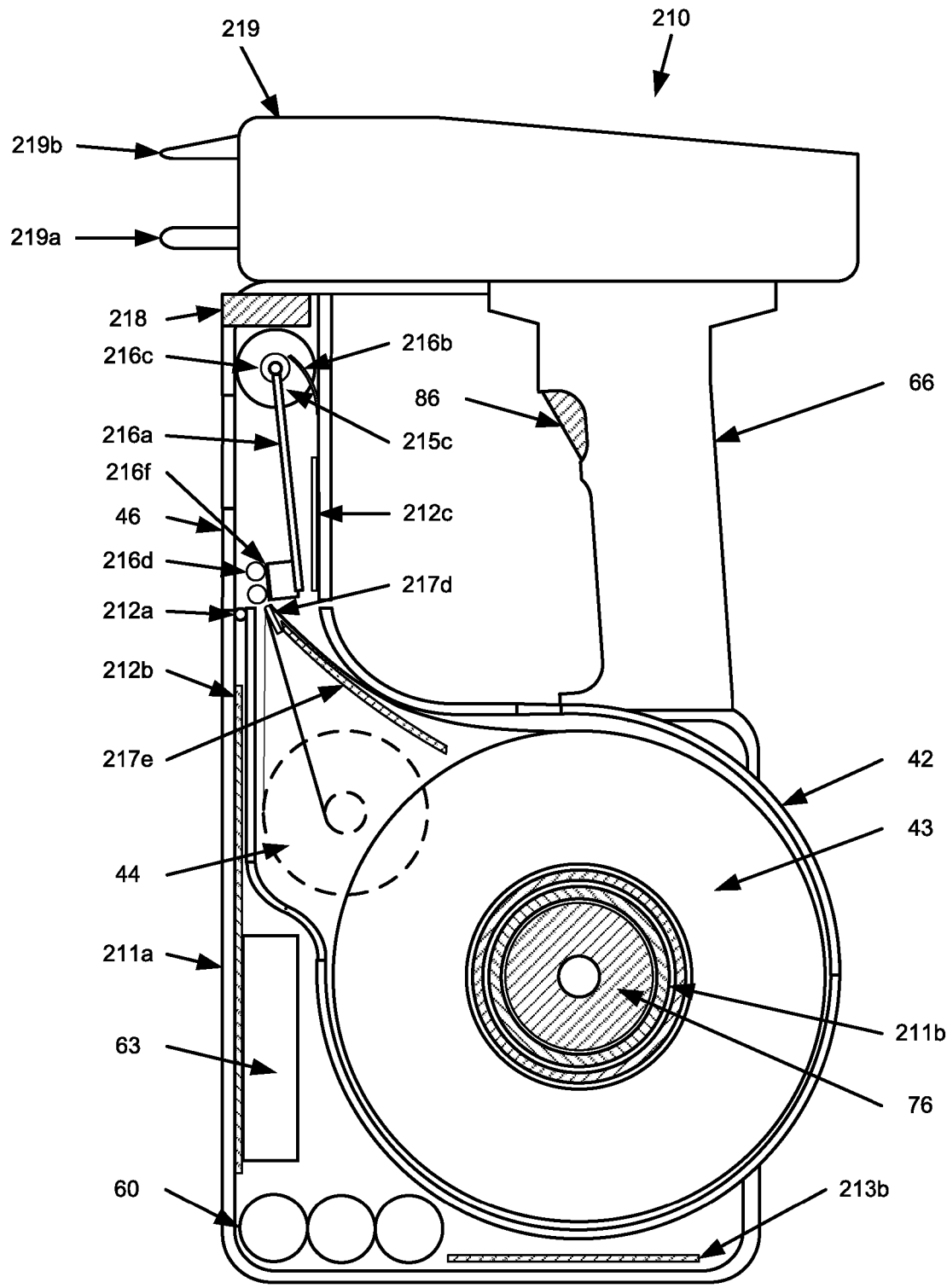
FIG. 10 is a schematic cross section of another encoder according to the present invention.

In certain embodiments an RFID encoder is combined with a sensor suite 218 as shown in FIG. 10 to enable semi-automated tag application to desired objects. In one embodiment, a semi-automatic encoder/applicator is created by integrating a single sensor device. The sensor responds to changes in light, capacitance, pressure, acoustics, or optical path length to a transport container. In another embodiment a suite of sensors are used to detect the attachment location of a commissionable transponder.

For example, changes in capacitance are detectable using certain QProx charge transfer capacitance sensors available from Quantum Research Group Ltd. of Hamble, England. Ultrasonic range sensors are available from supplier such as muRata Manufacturing Co., Ltd. of Kyoto Japan under the trade name Piezotite. Optical path length sensors are available from Keyence Corporation of Osaka, Japan. Sharp manufactures a compact distance-measuring sensor GP2D02 that is responsive in the range from 5 to 100 cm. Thus, when a predetermined set of conditions is realized, the sensor triggers, enables, or selects a desired action. In one embodiment, proximity or contact of sensor suite with the targeted transport container causes a second type of Trigger Event, resulting in the commissioning and dispensing of a transponder by an encoder.

In other embodiments, sensor 218 is designed to determine the distance an encoder resides from an object that is to be tagged. Range information is acquired and processed in real time to determine if the encoder is in Close Proximity, Near, or Far from a transport container. In certain embodiments a controller is programmed to alter threshold distances between each range category and to associate a function with each range. In certain embodiments, range category Close Proximity is associated with transponder programming and application functions. For example, the range category Near is reserved for transponder verification and/or reading functions; and Far is reserved for bar code scanning functions to verify that bar code information aligns properly with RFID transponder data.

In other embodiments a sensor suite is responsive to certain colors or patterns and uses that information to instruct the placement or detect the correct locations for applying good transponders and separate locations for discharging bad transponders.

FIG. 20 also shows how transponders 178 are rolled onto reels in preparation for encoding. Source roll 185 contains a supply of transponders ready for encoding. Release liner 182 conveys transponders 178 around peel device 183. Unless transponders 178 are mechanically prevented from rotating around peel device 183, they are conveyed onto take-up roll 184. Take-up reel 184 advances forward while source roll 185 lags behind due to drag created by a clutch, brake, motor or other back-torque generating device. Opposing torques of take-up reel 184 and source reel 185 result in tension in release liner web 182. Shape memory in face stock 181A preferably prevents transponder 178 from remaining adhered to release liner 182 as it passes over peel device 183, resulting in the leading edge lifting off and separating from webbing 182. If take-up reel 184 continues to advance, and transponder 178 does not collide with another object, its attachment to release liner 182 on its trailing edge will result in that transponder being passed completely around peel device 183 onto take-up reel 184. Full path rotation is preferably reserved for transponders that fail to properly encode desired information; and is therefore intended to be a reject process for failed transponders. Preferred embodiments result in tension created in web 182 in a process of tensile extraction of transponders from a source reel and selective transfer of good transponders onto an object or a person's finger. Mobile encoder 30 depends on a person's finger to prevent transponders 178 from rotating around peel device 183. Mobile encoder 220 depends on a target object such as carton face 228 to prevent transponder 223B from rotating around peel plate 222B on a path toward take-up reel 221J.

When the conveyance of RFID transponders results in the positioning of a transponder relative to a near field coupler within a signal null, the transponder and transport webbing are preferably nudged forward or backward to improve the signal coupling. This is preferably accomplished by momentarily activating the motor and transponder transport means 175C.

C. Mobile Encoder

Figure 5:
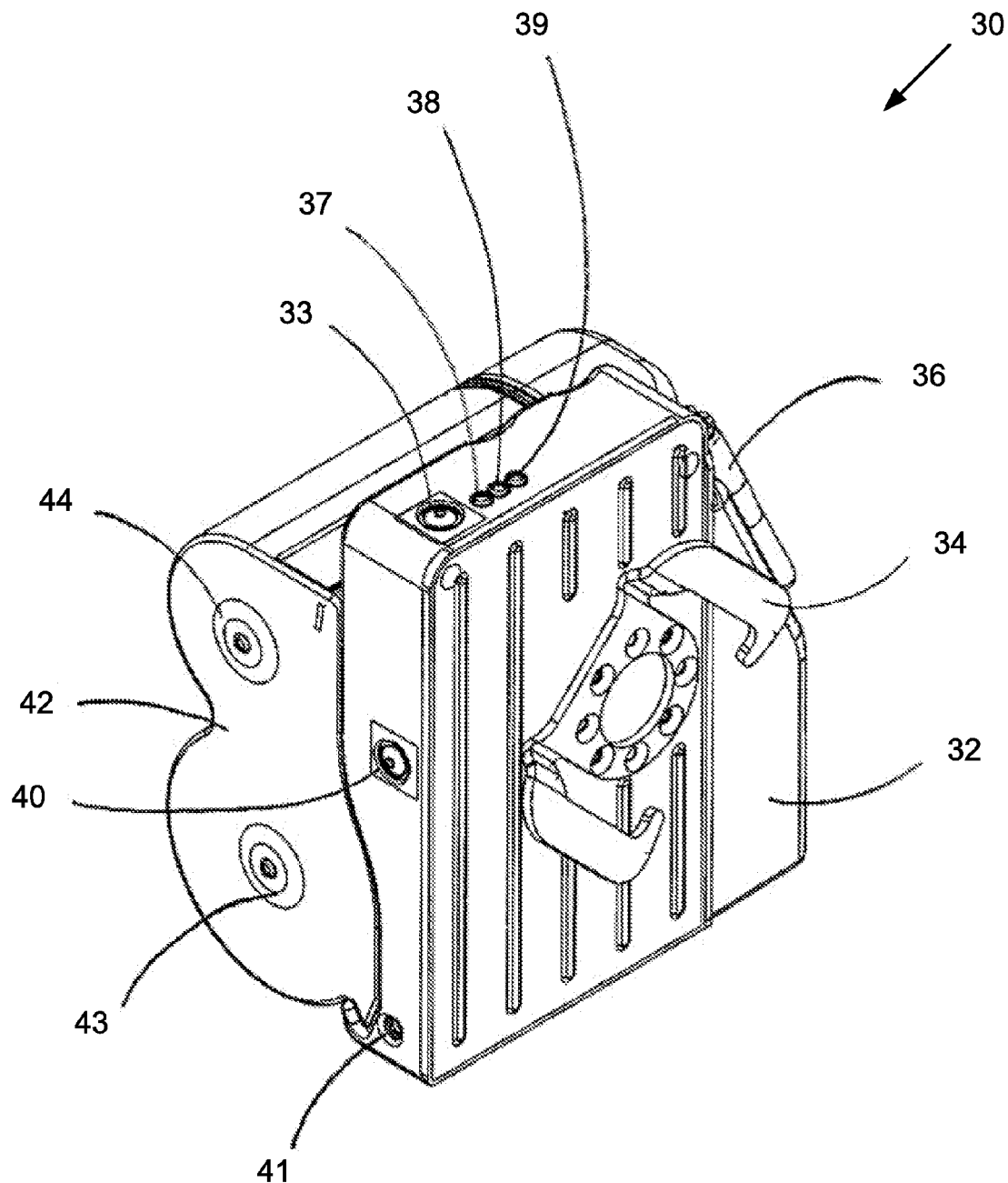
FIG. 5 is an offset orthogonal view of a mobile encoder according to one embodiment of the present invention.

FIG. 17 shows a system 170 according to one embodiment of the present invention including a mobile encoder 175. FIG. 5 shows a preferred embodiment for a mobile encoder. Mobile encoder 30 is comprised of housing 32, belt clip 34, antenna 36, on/off switch 33, system ready LED 37, data ready LED 38, and transponder ready LED 39. It is further comprised of auxiliary switch 40, and charger plug 41. A cartridge or other pre-packaged self-contained supply of transponders 42 is preferably latched, snapped, clicked, popped, inserted, slid, or releasably mounted to the body of housing 32. The cartridge preferably includes a take-up reel 44 for non-dispensed RFID transponders, and a port through which blank or securely encodable transponders emerge from source reel 43. The source reel is preferably comprised of a core which may be made from plastic or a recyclable kraft paper fiber to form a wound tube. A tube extends from the walls of cartridge 42 to form an axle around which release liner and transponders are wound and subsequently unwound.

In certain preferred embodiments source reel or roll 43 is constructed using materials such as non-petroleum-based plastics, laminated paper layers, and materials primarily comprised of natural fibers. In another preferred embodiment the entire pre-packaged self-contained supply of unused transponders is transported to mobile encoder 175, loaded into it, consumed, and disposed of preferably without generating landfill waste.

A key aspect of this invention is a complete pre-packaged, pre-assembled, pre-threaded, self-contained supply of encodable transponders, preferably unlocked with cryptographic access methods. The supply is preferably configured for efficient transportation and shipping, conveyance to a work site, and easy loading into mobile encoder 175, preferably in a single fluid motion.

FIG. 21 is a preferred embodiment of system 170 wherein printed symbols are optically scanned by internal optical reader 226. The embodiment shown in FIG. 21 uses a preferred method of sensing the linear motion of mobile encoder 220 across a target surface by using an optical mouse sensor 225. Such devices are commonly used to track the hand movements of the operator of a computer. Motion in either the X or Y direction is translated into numerical displacement representations which when timed are converted into linear velocities. Tracking and processing the primary axis of motion parallel to the major axis of the release liner, the web speed is preferably controlled by processing means 175B and transponder transport means 175C such that transponder 223A advances at a rate of speed that matches the velocity of the entire mobile encoder across the target surface. Optical mouse 225 tracks displacement across the target surface and also acts as a tamp head to strengthen the adhesive bond of each freshly applied tag. The process of attachment of the encoded transponder to the target surface is along a vector that is nearly parallel to the target surface at a speed that is based on real time feedback from the surrounding environment as sensed by the optical mouse or other sensor. Optical mouse sensor 225 preferably illuminates its target surface with either a LED (Light Emitting Diode) or a laser. Avago Technologies of San Jose, Calif. manufactures a variety of mouse sensors, both LED-based and laser-based. Laser illumination provides smooth and accurate motion sensing across a variety of surfaces. The model ADNS-6150 small form factor lens working in conjunction with the ADNS-6530 integrated chip-onboard laser sensor and single-mode vertical-cavity surface emitting laser can be used to not only detect motion in the X and Y directions, but also to some degree in the Z direction. Displacement along the Z (depth) vector is reported by the decrease in the number of resolvable features within the field of view as the target surface fades away from the optical focal point. That measurement is reported in the surface quality (SQUAL) register.

Optical mouse sensor 224B is used to measure the linear velocity of transponders as they move along the path of the release liner toward peel device 222B, as well as sense the gaps and edges between transponders 223A and those adjacent to them. The physical outline 178 of transponders 223A are a reliable indication of the location of RFID inlay 181C located within each transponder 223A and enhance system performance with reliable positioning relative to near field coupler 224A2. The angular velocity of motor 227B and gear train 227A are controlled to achieve a linear transponder velocity that matches the velocity of the mobile encoder itself as it moves across the target surface. Therefore an operator with a fast hand motion is just as successful as a person with a slower hand motion, both will result in a transponder that lays flat, co-planar with the target surface, void of kinks or wrinkles that are characteristic of a poorly controlled transponder application process. In either case, transponder dispensing by transponder transport means 175C will not initiate until optical mouse sensor 225 preferably illuminates the target surface and detects a minimum number of valid features as reported by the SQUAL register internal to the ADNS-6530.

RFID Interrogator 224A encodes RF transponders using either LF (Low Frequency), HF (High Frequency), UHF (Ultra High Frequency), or microwave radio energy. Transponders may be powered by radio energy, light, or stored energy from a source such as a battery. RF coupling is preferably through a near field coupler, an inductive loop or other suitable transducer 224A2 connected to interrogator 224A to focus RF energy on a small area within mobile encoder 175, 30, or 220.

Certain preferred mobile encoder embodiments will not encode RF transponders that fail authenticity tests. In a like manner, RF transponders will preferably not allow themselves to be programmed unless the interrogator can successfully unlock its secured memory banks. This is a preferred method of protecting transponder cartridge and mobile encoder supply chains from counterfeits and knock-offs. Mobile encoder 175 and the transponders loaded into it will only be successful in exchanging certain data if certain data encryption and challenge response protocols are adhered to. In a preferred embodiment each authorized RFID transponder converter company uses one or more encryption keys to generate passwords that lock the RF tags, whereby preventing them from being programmed unless they are unlocked using the same password. Passwords of this type are specified in the EPC Gen 2 specification and in ISO standards. The passwords are preferably generated by processing means 175B using a public key from publicly readable data such as an asset number or a transponder serial number. A shared private key is then used by an encryption algorithm such as AES in order to create a password or a collection of passwords that can be used to lock or unlock one or several RF tags. Other methods may be used that provide a high degree of certainty that the both the transponders and the mobile encoders are from legitimate sources. Individual failures or patterns of authentication failures are preferably reported to a central database through wireless communications means 175A for subsequent fraud investigation.

Peel device 222B is part of the mobile encoder and preferably rotates or pivots about pivot point 222A into position 222C and a corresponding position (not shown) in FIG. 21. Peg 221K helps guide the web to peel device 222B. When cartridge 221 is inserted into applicator body 227F the web is held in a non-interfering position by guide post 221F and its accompanying cartridge guide post such that peel device 222C can self-thread around the transport web without human effort. This is an improvement over prior art where a peel device is an integral part of the pre-packaged self-contained supply of transponders and requires threading during the cartridge manufacturing process.

Peel device 222B preferably contains a shield on the outer face of the blade, through which radio energy will not pass to encode or interact with a rejected transponder 223B. The dielectric material of the peel device 222B provides sufficient separation from a transponder within the encoding zone and the shield on the back side of the peel device. This is another advantage over a peel device that is part of the cartridge, where the cost sensitivity is much more acute. The shielding on the back side of peel device 222B may be any suitable metal attached or adhered in any reliable or economical manner against the non-conductive dielectric structure of the peel device.

Rejecting transponder 223B requires that mobile encoder transponder peel device 222B have sufficient clearance from target surface 228 as determined by optical mouse sensor 225 using either the SQUAL reading or the shutter readings. Such readings are used to determine if there is sufficient space to advance and rotate a bad transponder 223B around the distal end of peel device 222B.

FIG. 1 shows a system 10 according to one embodiment of the present invention including a mobile encoder 30. And, FIG. 5 details one possible mobile encoder 30. In this embodiment, the encoder can attach to the belt of an operator, accordingly, mounted on the housing 32 is a belt mounting means such as belt-clip 34, which easily adjusts for left-handed or right-handed operation and corresponding mounting on the belt (not shown) of the operator. An external antenna 36 enhances wireless connectivity to a host or network computer (not shown in this view), or to a remote-mounted computer device such as a PDA or bar code reader. Several operator indicator lights 227E including a system-ready LED 37, data-ready LED 38, and tag-ready LED 39 mount on the housing enabling the operator an easy view of the device status.

Also included on the exterior of the housing are an external, power-cord receptacle 41 so that the on-board lithium-ion, nickel metal hydride, or other appropriate battery 227D may be charged as required. A combination on/off-next switch 33 enables the operator to selectively power up the encoder. A reset port, such as a recessed reset button (not shown in this view), enables an operator to reset the software settings of the device circuitry on control board 227C as may be required.

A cartridge 42 containing a plurality of RFID transponders releasably mounts to a face of the housing 32. The cartridge further includes a take-up reel 44 for non-dispensed RFID transponders, a port 46 (above take-up reel 44 but not shown in FIG. 5) for dispensing commissioned transponders, and a supply reel 43 for holding blank RFID transponders prior to commissioning.

In further embodiments, a cartridge 221 containing a plurality of RFID transponders releasably mounts to the body of housing 227F. The cartridge further includes a take-up reel 221J for collecting release liner and non-dispensed RFID transponders, and a port through which blank or securely encodable transponders emerge from source reel 221E. The source reel is comprised of core 221A which may be made from plastic or a recyclable kraft paper fiber to form a wound tube. A tube extends from the walls of cartridge 221 to form axle 221B around which core 221A rotates. Brake shoes 221C create drag, resulting in back torque on the source core, the magnitude of which is controlled by screw 221D which with a knob (not shown) is used to adjust the force applied by brake shoes 221C. The back torque for cartridge 221 is alternatively developed through a motor or an expandable friction coupling into a brake mechanism attached to encoder body 227F.

Take-up core 221H is driven by a tight coupling with drive hub 221G. This tight coupling is achieved through a combination or selection of tight fit, expandable coupling, and sharp teeth. The result is a hub that will easily slide in or out of core 221H with little effort, but still be capable of delivering a substantial amount of drive torque through that connection without slippage. Drive torque is delivered from gear motor 227B to hub 221G through drive gear 227A the teeth of which engage with each other as cartridge 221 is set into position and locked into place.

In a preferred embodiment, mobile encoder 30 cryptographically unlocks, encodes, and verifies each transponder one by one. In preferred embodiments, transponders are verified more than once. One time immediately after programming with a desired data payload, and then again a second time after encoder 220 automatically dispenses an RFID transponder 223A onto target surface 228. This second verification step insures that the properties of target surface 228 or other nearby materials do not adversely affect the performance of transponder 223A.

In another preferred embodiment, encoder 220 is used to encode and dispense a pattern of several transponders 223A onto a target surface 228 at regular intervals in order to map the surface of a container for example in order to determine an optimal location for a placement of transponders. This information is then preferably used for engineering and planning purposes for high-volume transponder application in a production or distribution facility. Transponders may be designed for operation in any or all of the UHF, HF, LF, or microwave frequency bands.

Figure 9:
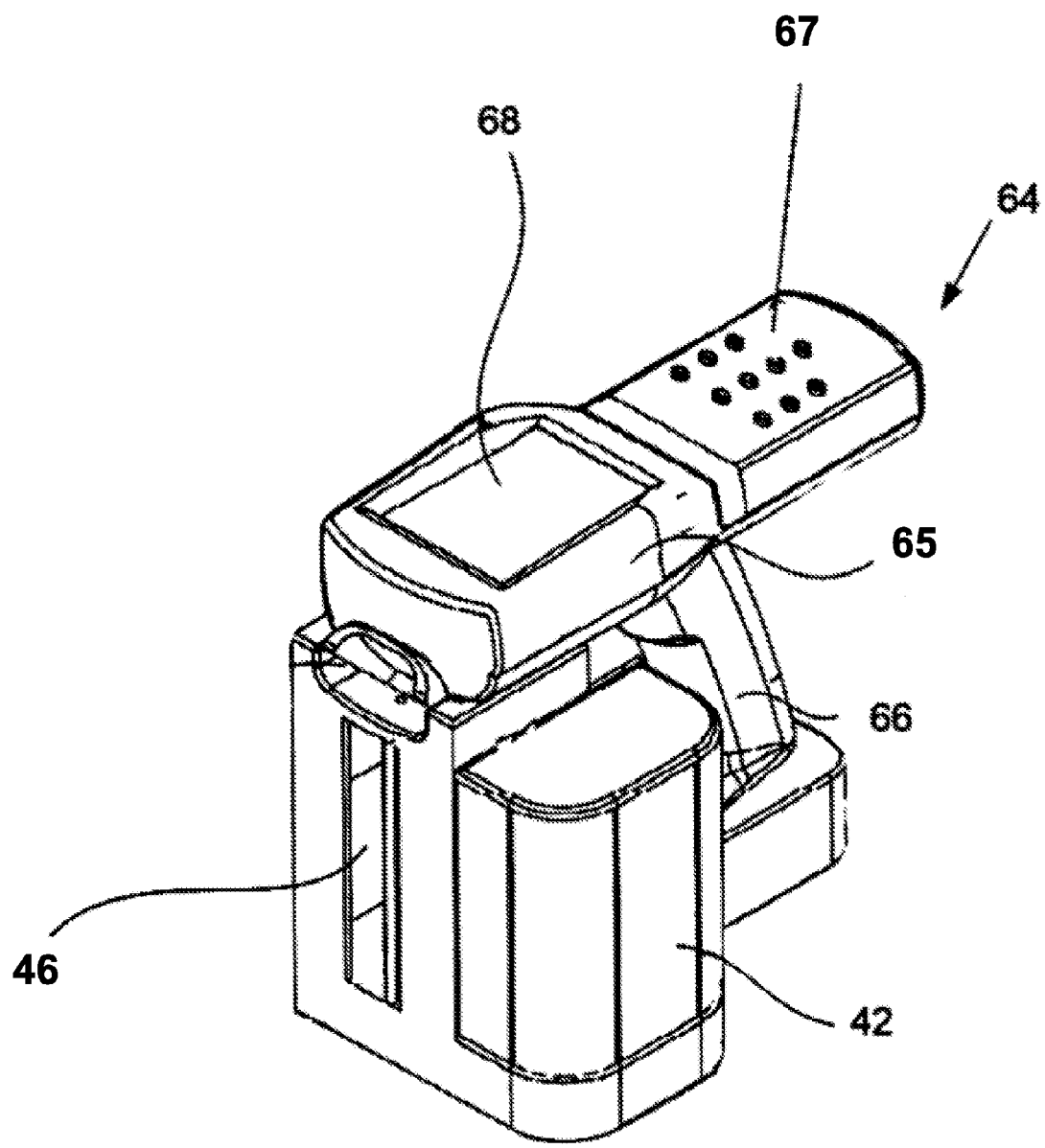
FIG. 9 is a frontal-offset view of a hand-held, mobile encoder according to the present invention.

In one alternative embodiment, the mobile encoder 64 includes a handle (as FIG. 9 shows, for example) for hand operation of the encoder. In another contemplated embodiment, the mobile encoder is fixed to an assembly line in a stationary manner. Accordingly, the stationary-mounted encoder further includes machine-controlled devices for extracting a commissioned RFID transponder from the encoder and places the transponder on the container of interest by means well understood in the art.

In the aforementioned embodiments of the mobile encoder 30 (or hand-held encoder 64 of FIG. 8 or FIG. 9, for example) key features commonly shared include means for enable Gen2 EPC or ISO standards compliance and multiple printer-emulation modes. On-board power source 60, such as a rechargeable lithium-ion, Nickel Metal Hydride, or other battery enables freedom of movement as does means for wireless connectivity to a data network, such as the 802.11 wireless LAN (Wi-Fi), Bluetooth, or other standards-based communications protocol. However, a conventional power source that requires connectivity to a power-grid and a cable-based data network connectivity link would work under certain circumstances.

Further, in contemplated embodiments, the fixed or mobile encoder enables selective mounting to a magazine or cartridge filled with un-commissioned RFID transponders, which facilitates rapid and easy loading of the encoder with ready-to-use RFID transponders and further enables re-use, re-commissioning, and recycling of un-dispensed transponders and the associated cartridge. The mobile encoder can be monitored and controlled by virtually any handheld or mobile device, a host computer in a central location, or over the Internet.

Certain features and methods described and explained with relation to handheld applicators are also relevant to non-mobile RFID tag applicators that use a magazine, cartridge, reel, or roll to handle, transport, and dispense RFID tags, inlays, transponders, or wireless sensors. Magazines, cartridges, reels, and rolls are preferably capable of carrying either new or used tags and are preferably capable of being used in either mobile or nonmobile applicators. Magazines, cartridges, and reels are preferably refilled and reused. Magazines and cartridges preferably protect RFID tags from ESD.

Cartridges preferably indicate their empty/full status with a visible indicator such as: an LED, an LCD, a mechanical flag, a window with a view into the source reel, or other such indicators that help an operator choose which cartridge from which to next consume tags.

The mobile encoder 30 is activated (turned on) when an operator selectively depresses the combination on/off-next switch 33. However, depressing the on/off-next switch for about three seconds or longer results in a sleep-mode cycle that can be interrupted by re-pressing the on/off-next switch. In sleep mode the operator indicators (LEDS 37, 38, and 39) will turn off. If active, the mobile encoder system-ready LED 37 illuminates and connects to the assigned network. Network connectivity results in the illumination of both the system-ready LED 37 and the data-ready LED 38.

Mobile encoders 175 and 30 optionally receive commands and data via the wireless link from the remote computer 172 or optical reader 173. Special bar code commands are scanned by optical reader 173, passed through wireless communication means 175A, and interpreted by processing means 175B mobile encoder 175 to perform certain pre-programmed functions. Commands originating from either computer 172, optical reader 173, or internal bar code scanner 226 (also designated in FIG. 1 as internal optical reader 175F) perform functions in categories that include power management, data management, wireless configuration, security, configuration options, and utilization of internal resources.

The encoder receives commands and data via the wireless link from the remote computer 20 or host network computer 11 (of FIG. 1). The data represents information to be encoded on an RFID transponder. The information is stored in the encoder's on-board memory and the tag-ready LED 39 or 175K rapidly blinks green (cycles on/off to pulsate). An RFID transponder is moved from within the cartridge 42 to a position on the top edge of the cartridge for encoding in the encoder and the transponder is encoded with the appropriate information. The transponder is tested and if it is good—contains the data and encoding was successful—all three indicator LEDs indicate a solid-green color. The operator removes the encoded RFID transponder from the encoder and places it on the container of interest.

In the event that the encoding process failed, the bad transponder is detected and retained by the encoder, where it remains on the take up reel 44 inside the cartridge 42. The take up reel also collects the release liner as the encoder 30 dispenses good transponders (properly encoded RFID transponders). The take up reel returns to a re-cycling center where components are re-used or recycled as necessitated. Further, the re-cycling center can perform failure analysis on returned transponders.

Figure 6:
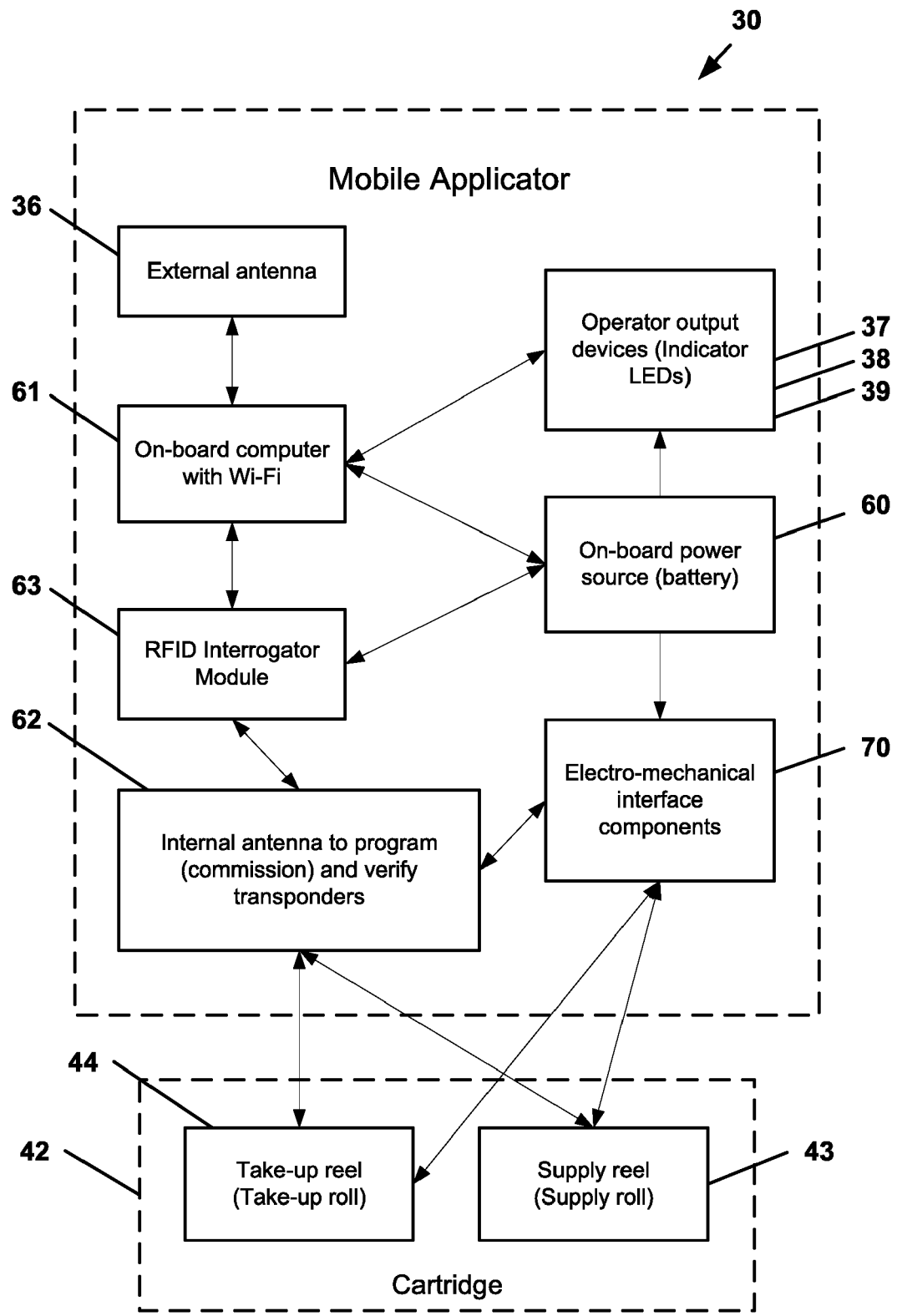
FIG. 6 is a schematic block diagram showing some components of the mobile encoder of FIG. 5.
Figure 7:
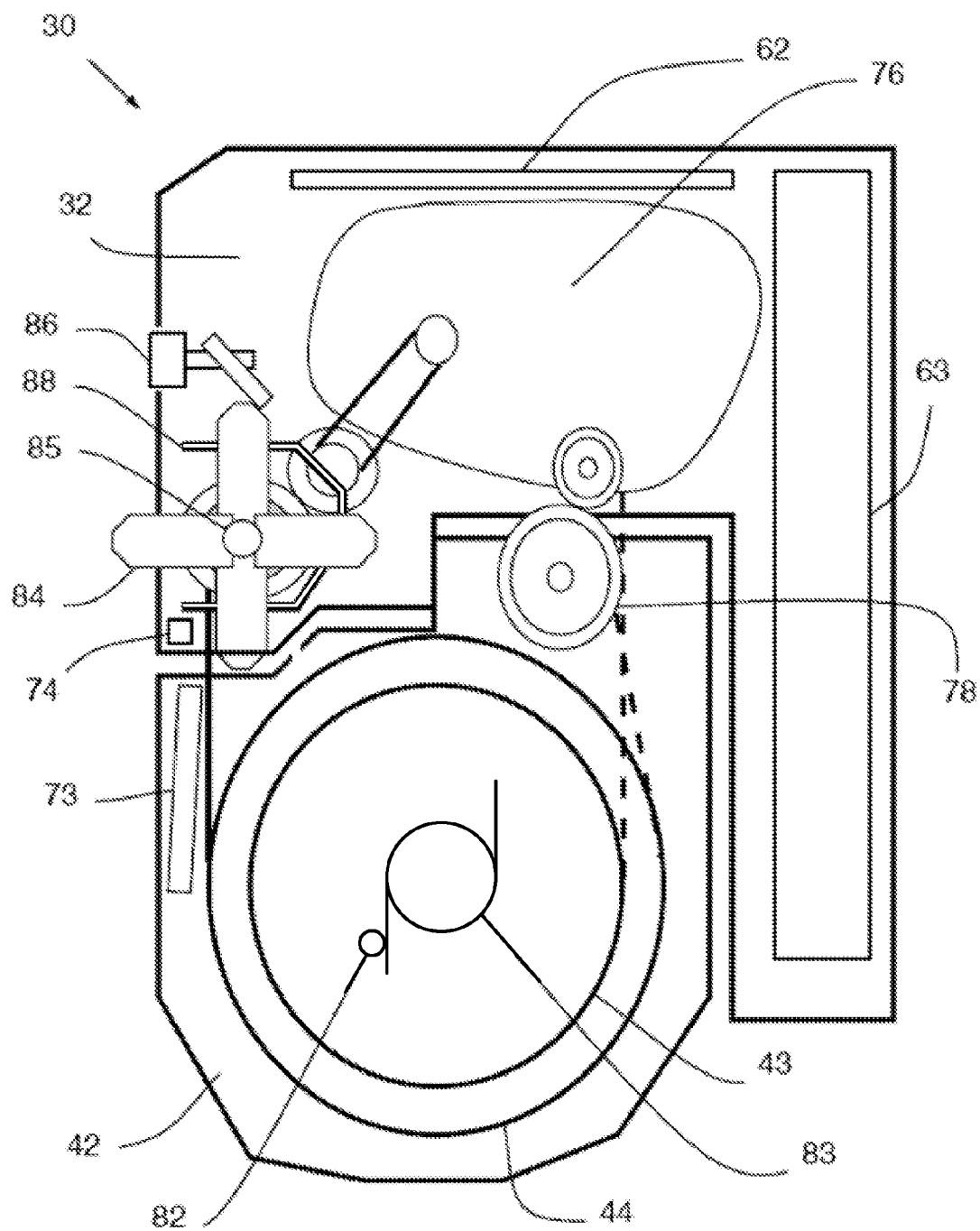
FIG. 7 is a schematic cross section view showing electro-mechanical components of one embodiment of a mobile encoder.

FIG. 7 is a schematic diagram of additional electro-mechanical components 70 (as generally referred to in FIG. 6) and logic components of a possible encoder 30. An RFID Module 63, such as a MP9311 UHF reader module available from Sirit Technologies, 1321 Valwood Parkway, Suite 620, Carrollton, Tex., 75006, USA, communicates with a vertical polarized YAGI antenna 62 with a downward side lobe to low-power program (commission) RFID transponders to create an RFID transponder, and the same downward side lobe and verify transponders at low power also can read far-field transponders at a higher, second power. Additional components include a mechanical paddle trigger 86 for operator-selected override of the reel of RFID transponder stored in the supply or source reel 43 in the cartridge 42. A drive motor 76 coupled to a dual output shaft gearbox drives the source transponder reel 43 via an intermediate take-up reel gear interface 78 at the cartridge mouth. Another gear assembly along with a spring couple 85 advances and positions the tag feeder paddle 84 with feedback from paddle position sensor 88. A tag sensor 74 detects the location of the RFID transponder to-be commissioned by the YAGI antenna 62. As the reel of RFID transponder advances inside the encoder, the lead edge passes the ratchet post 82. If the now-commissioned transponder is read by the antenna 62 as "good", a ratcheting-back torque spring 83 enables a peel device, such as the shield and tag peel edge 73, to engage, forcing the commissioned tag to peel away from the carrier layer, which continues on to the take up reel 44. In the event of a "bad" tag—that is, the antenna 62 reads the RFID transponder and determines an error has occurred—the shield 73 does not engage, allowing the defective transponder to remain on the carrier layer and proceed to the take-up reel. Once the good transponder is removed from the encoder, the tag sensor 74 detects the condition and enables the encoder to stand-by for the next event. Transponders are read, written, and verified when an operator initiates an action such pulling a trigger 86, pushing a button, or some other command sequence.

Certain protective enclosures, such as cartridges 42 or magazines, are part of a family of interchangeable magazines of similar size, shape, and functionality, which are capable of housing and dispensing certain types, styles, shapes, and sizes of new or used RFID transponders. Transponder sizes typically range from 4 mm-thick foam-backed transponders measuring 12 mm wide down to thin transponders that are 15 mm wide on 19 mm pitch.

In at least one embodiment, the magazine or cartridge 42 includes a unique and embedded, RFID transponder which enables automatic interrogation and tracking of cartridge 42. In certain embodiments, to minimize interference, the cartridge-specific and unique RFID tag or RFID transponder operates in a frequency band that is different than the supply of RFID transponders contained within the protective enclosure. Alternatively, other embodiments selectively interrogate cartridge identification transponders that operate in the same band as transponders within the cartridge that are to be applied.

Certain encoders require replenishment of the battery or other internal, on-board power source 60, such as a fuel cell, or other energy storage technology. Accordingly, in some embodiments, an encoder 30 (or encoder 64 or encoder 210 of FIGS. 8, 9, and 10) further includes a remote, selectively coupling base unit. The base unit enables a replenishment of magazines or cartridges, provides replaceable power sources, recharges the on-board power source, serves as a communications gateway, and provides a user interface for programming and maintenance of the encoder. For example, spare transponder magazines/cartridges are retained in cartridge pockets where they are protected from damage. Cartridges indicate their empty/full status with a visible indicator such as: an LED, an LCD, a mechanical flag, a window with a view into the source reel, or other such indicators that help an operator choose which cartridge from which to next consume transponders. The encoder, also, is retained by a protective pocket to prevent damage and to make any required electrical or mechanical connections to the base unit. In some embodiments a base unit mounts to diverse operating locations including various models of fork lift trucks. In such applications, the base unit includes a variety of wired and wireless communications options to enable omni directional communication with the encoder, cartridges, a host computer, vehicle mount terminal, a fork truck computer, or other relevant computing devices. The base unit includes a power system that is suitable for the application, including power filtering and energy storage capabilities such as batteries or fuel cells.

As with all ESD-sensitive equipment, care must be taken to avoid a build-up of damaging electrostatic charges. Accordingly, in certain embodiments charge is removed using a variety of conduction methods including wiping, air, and humidity controls, or use of special materials that contain short conductive elements optionally arranged within a flexible elastic cord.

In some embodiments, the encoder adapts to use a particular type of RFID transponder. One type of suitable RFID transponder is model number AD-220 from Avery Dennison of Brea, Calif. or, alternatively, Raflatac model 300846 from Tampere, Finland, or a Spider transponder or FT-33 FAT tag from RSI ID Technologies of Chula Vista, Calif. Such a transponder is die cut and adhered to release liner. Additionally, wireless sensors are manufactured to specifications that are compatible with the specific encoder, including such specifications as core diameter, outer diameter, and web width. Alternatively, certain steps are required to prepare a standard roll of ALL-9338-02 tags for use in an automated encoder, including unrolling from a large roll (up to about 6-inches in core diameter) onto several smaller rolls having a smaller core diameter (of about 1-inch to about 2-inches in core diameter).

Encoder 30 communicates with a remote computer and includes options to physically, electrically, and communicatively integrate with a portable data terminal (PDT) or a mobile computing platform. Certain PDT's have a variety of wireless connections including PAN and WLAN. Certain PDT's include a bar code scanner comprising a laser, an imager, or other means. In other suitable PDT's an RFID interrogator and antenna are built-in, while certain others have a card slot manufactured to a standard such as PCMCIA, CompactFlash, or Secure Digital, into which interrogator/antenna is plugged into. An example of such a card is the MPR 5000 that plugs into a PCMCIA Type II slot and is available from WJ Communications of San Jose, Calif. The MPR 5000 is compatible with handheld computers such as the Hewlett Packard iPAQ5550 or other models that accommodate smaller card-form factors, enabling them to read and write EPCglobal or ISO 18000 compatible UHF RFID transponders.

Other events, information, and status—such as changes in transponder readiness, transponders remaining on the source roll, remaining charge in the battery, changes in range-status between certain predefined states such as Close, Near, and Far—are communicated to the associated PDT. Other possible information, including certain power management functions, commands, status, and data-to-be-encoded into each readied transponder, is provided to the PDT over a wireless connection. Such a configuration puts the encoder in the role of a peripheral device to the PDT 219, with PDT 219 managing the primary user interface and most computation functions.

In some embodiments the encoder adapts to exchange information with a host device, including a PDT, in either a batch-mode or through a real time connection. Batch mode uses a periodically connected data transfer channel such as a wired connection. Certain wired connections include serial data, infrared, optical, Universal Serial Bus, a parallel port, or other physical data connection. Certain real-time connections include wireless data links including Personal Area Network (PAN), Wireless Local Area Network (WLAN), and Wide Area Network (WAN). Certain PAN connections include Bluetooth and Zigbee. Certain suitable WLAN connections include IEEE 802.11a, IEEE 802.11b, and IEEE 802.11g.

For certain encoder embodiments passwords are encoded into transponders or wireless sensors when they are commissioned. Passwords are safeguarded using cloaking, obfuscation, cryptographic techniques, secure and trusted channels, locked memory, and other methods that are commonly used to protect confidential information. Passwords are generated or retrieved from data encoded in an RFID transponder to generate an index into one or more databases that contain a one dimensional array of passwords, a two dimensional array of passwords, a multidimensional array of passwords, or an array of actual or pointers to algorithms used to generate passwords from transponder data, for example. Alternatively, cryptographic algorithms are used to generate passwords from transponder data.

Although this disclosure makes specific reference to a mobile encoder, it is understood that the encoder can easily adapt and be readily configured to a fixed operating environment. For example, it can be mounted to a forklift truck or a high-speed conveyer line and maintain advantages of wireless communication, rapid change-over and other qualities as discussed and developed more fully in this disclosure.

D. Interrogator Apparatus

Working as a stand-alone device, or combined with an encoder, certain embodiments of the present invention include an RFID transponder reader, also called an interrogator. The interrogator, in one embodiment, is a physically separate device that is solely in wireless communication with the encoder. In another embodiment the interrogator includes a wired connection to the encoder. In yet another embodiment, the interrogator connects to the encoder via an intermediate processor, such as a remote computer, or some other intermediate device. In yet another embodiment, the intermediate device is a shared processor in a physically integrated encoder/interrogator apparatus.

Regardless of the physical configuration of the interrogator, its function is to encode and/or verify a RFID transponder's (including wireless sensors) functionality. Certain embodiments use a mobile handheld reader to verify transponder functionality after carton attachment. Certain handheld readers also read bar codes that either partially or completely specify the data that is to be programmed into a transponder. Accordingly, an optical path from the interrogator to a location for reading bar code labels is used to identify certain information about the objects or containers that are to be tagged. Additional transponder encoding instructions and data is acquired through an integral network interface or a batch mode memory in the interrogator.

In certain embodiments, a shield structure incorporated in a combined interrogator/encoder prevents RF fields from interrogating or reprogramming RFID transponders yet-to-be-commissioned that are resident in the combined interrogator/encoder device.

Figure 8:
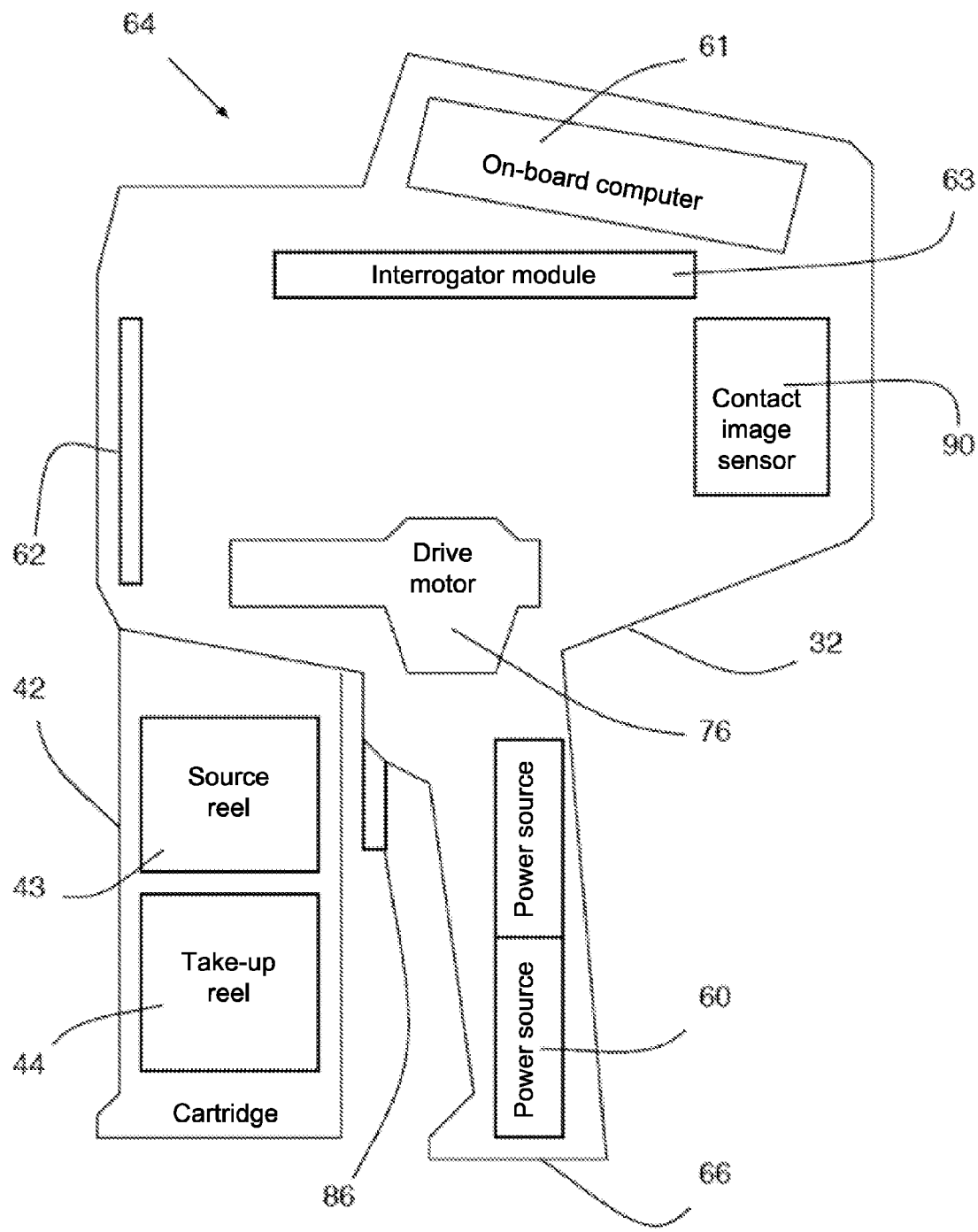
FIG. 8 is a schematic cross section of an encoder according to the present invention.

In one embodiment, shown as a cross-sectional schematic in FIG. 8, a contact image sensor (CIS) 90 or a linear optical array is used to scan along the length of an RFID transponder before it is applied to a container. CIS 90 produces a video stream that is decoded and then interpreted and stored by an on-board Computer 61. CIS or a similar linear array sensor is capable of reading both linear and two-dimensional bar codes. In certain embodiments, CIS reads two-dimensional bar codes before attachment to inlay or transponder. The on-board computer creates a logical association between bar codes and the commissioned RFID transponder. Encoder 64 reads and associates all bar code symbols on a single segment with the RFID transponder or inlay adhered to it.

In FIG. 10 when an operator pulls the trigger 86, which is either a mechanical trigger or an electro-mechanical device, the on-demand commissioning of the RFID transponder occurs and nearly simultaneously is pressed against a container within a fraction of a second. In certain embodiments, mechanisms internal to encoder 64 transfer mechanical force to the RFID transponder tag through the use of air, springs, motors, plungers, elastomers, or other energy storing or delivering methods. Reloading of the next tag (next transponder) and readying of the system are performed within a time interval that is acceptable to the operator and enables a high degree of productivity for tagging cartons, pallets, or other transport containers.

In certain embodiments of a combined interrogator/application, a trigger 86 couples to an electrical switch having one or more stable positions that are detectable by a controller. In certain modes of operation trigger-switch state is coupled with range information from a sensor suite 218 to execute functions at predetermined ranges at predetermined times. The result is a trigger that functions based upon detected range from a container or other object of interest. This advantageously improves operator efficiency and productivity as one trigger executes several different functions that are typically involved with RFID tagging including the tagging of bar-coded cartons that have been selected to receive wireless sensors.

Verification of bar code occurs either before or after an RFID transponder is commissioned and the tag applied to the container by merely stepping back to a point where the sweep angle of a laser beam or field of view of an imager can read a bar code label. In certain embodiments ranges shorter than that, but not in Close Proximity, are used for sweeping a radio frequency interrogation signal across the faces of multiple cartons to assure that the correct tags, the correct number of transponders, and the correct data within that transponders were all properly programmed.

In certain embodiments Close Proximity range is reserved exclusively for programming, applying, and verifying one transponder, all in a single pull of trigger. In other embodiments, the interrogator includes programmable conditions that enable Trigger Events to interact with external devices or nearby equipment. For example, at a predetermined range from the interrogator, activation of the trigger causes the encoder to transmit a coded signal to an external device as an indication of an operator action: at a Far-range the signal to requests an external device to read a bar code and the bar code information is decoded and transmitted back to encoder. In another embodiment, decoded barcode information is processed by a portable data terminal (PDT), a vehicle mount terminal, or other computing device.

The on-board computer 61 controls the operation of the RFID Interrogator Module 63 to read, write, and verify RFID tags, inlays, transponders, and wireless sensors that are applied or are within range of the interrogation fields produced by antenna 62. The encoder 30, capable of reading multiple RFID transponders near it, can, in certain embodiments, produce a linearly polarized radio field via the internal antenna 62. In another embodiment, the internal antenna produces a horizontally polarized RF field. A commissioned transponder can be read both before and after it is applied to a transport container. When multiple transponders are within the interrogation field of the encoder 30 with an interrogator module 63 the on-board computer 61 determines which transponders are commissioned and dispensed versus those transponder that have not. In certain embodiments, the on-board computer maintains records of transponders recently applied in order to properly determine how to interact with each transponder in the field of the internal antenna or other antennae under the control of RFID Interrogator.

In one possible embodiment, the interrogator/encoder utilizes preprinted information on a set of RFID transponders. The pre-printed information includes one or more logos, an EPC-global Seal, and other informative alpha-numeric or bar-code data. Certain preferred embodiments of encoder/applicators 30, 64, and 210 correlate RFID tag data with data encoded in certain preferred bar codes. In certain preferred embodiments, applicators such as applicator 30 read the bar code preferably using a sensor such as CIS 90 as the tape is unrolled from a spool. In certain other preferred embodiments, an RFID tag is located on cartridge 42 and contains a numerical value that is directly or indirectly representative of the numerical values optically encoded into the bar codes preferably at least indicating the starting numerical values of a number sequence. Other additional information is also encoded in the RFID tag in certain preferred embodiments, including the number of tag positions, the number of good tags, the ending sequence number, the date, time and place of tag conversion or other preferred commercial, logistic, or manufacturing information. In certain preferred embodiments of applicators 30, or 210 certain wireless tags attached to cartridge 42 are capable of being read. In certain preferred embodiments the interrogator such as interrogator 63 is capable of reading an RFID tag mounted to the loaded cartridge, and is also preferably capable of filtering out its response to interrogation or programming of RFID tags.

Certain embodiments have a motorized tape drive and dispensing system. Certain embodiments contain some or all of the following: a rechargeable battery, an operator display, a wireless interface, a network stack, an IP address, a PCMCIA port, a Compact Flash port, a USB cable, a serial cable, a dock port, a window to allow the operator to view the transponder attachment process, or a bar code scanner.

One suitable interrogator includes model MP9311 available from Sirit Technologies of 1321 Valwood Parkway, Suite 620 Carrollton, Tex. 75006, USA. Other RFID transponder or wireless sensor interrogator modules with other feature sets are also possible for use in the interrogator/encoder.

FIGS. 8 and 9 show one possible interrogator/encoder 64 according to the present invention. The interrogator/encoder 64 comprises a housing 65 having a user input device 67, such as a key pad or key board, and a user output device, such as an LCD screen 68, for displaying optically scanned label data, RF interrogated data from a transponder, and other information including on-board diagnostic functions, bios status, and external information provided from a remote computer as sent over a wireless network, for example. A handle structure 66 enables point-of-use deployment while cartridge 42 enables on-demand commissioning of RFID transponders, which are dispensed from the transponder port 46. In this embodiment, an integrated YAGI antenna 62 creates a large forward-looking main lobe of radio frequency energy for interrogation of commissioned RFID transponders. The internal antenna also produces side lobes of RF energy that although attenuated from the main lobe by several dB, couple enough power into nearby readied transponder to interrogate and write to it.

As further depicted in FIG. 10, a reflector 219b passively reflects RF signals from an upper side lobe downward toward readied tag 216f. Backscatter from tag 216f propagates to both antenna 219a and reflector 219b for processing by the interrogator. Having such an antenna embedded in PDT 219 and mounted to the structure of the encoder housing enables the PDT 219 to encode and verify readied transponder 216f while commanding the encoder to commission and dispense a tag when a particular Trigger Event or a predetermined range status change occurs.

An antenna, or alternatively, leaky coax 212a or a near-field coupler is located outside of protective enclosure of cartridge 42 in a location very close to the tag attachment zone in front of a tamp head or tag application roller and holding rollers 216d or hammer 216a.

In some embodiments antenna 212b is a patch antenna with a radiation pattern toward the tag attachment zone. In other embodiments the antenna is a near field coupler. Alternatively, leaky coax, a type of coaxial cable having slits, slots, or perforations that allow radio frequencies to leak in or out, is used in encoders according to the present invention. A coupled-mode cable, which does not radiate as well as radiating-mode cable, is constructed with closely spaced slots in a corrugated outer conductor. Radiating-mode cable typically has a foil outer conductor with non-uniformly spaced slots arranged in a periodic pattern. Coupled-mode cable is a slow-wave structure. In free space its external fields are closely bound to the cable and do not radiate, except for minor end effects according to "Prediction of Indoor Wireless Coverage by Leaky Coaxial Cable Using Ray Tracing" by Samuel P. Morgan of Bell Laboratories, Lucent Technologies.

In certain embodiments an interrogator drives a signal into a leaky coax that is terminated in a purely resistive load of about 50 ohms. An RF-switch selects between radiating and non-radiating loads including an antenna or leaky coax and, therefore, avoids mismatched load impedance.

In other embodiments internal antenna 212b or 212c is a patch antenna with its strongest lobes oriented toward the tag holding and placement area in the region of holding rollers 216d. Antenna 212c or leaky coax 212a work with an interrogator to produce electromagnetic fields to interrogate, program, and verify wireless sensors. Shield 217e prevents interrogation or programming of RFID transponders until they arrive at separation roller or tag peel edge 217d. A reflector is used in certain embodiments to reflect RF radiation toward a readied transponder. In the event that verification fails, the operator is informed that the bad tag (or inoperable transponder) is to be discharged onto a surface of a third object other than the encoder or the transport container, for post-mortem analysis.

Referring to FIG. 10 drive motor 76 is preferably located inside the center of source reel 43 within the circular walls of applicator housing 211b, around which cartridge 42 is nested when mated to interrogator/encoder/applicator 210.

Motor 76 is mounted to the structural frame of applicator 210 and preferably transfers mechanical power to certain drive points preferably using gears, belts, or drive shafts within applicator housing 201a or 211a. In certain preferred embodiments of applicator 210 certain preferred drive points include take-up reel 44, source reel 43, or hammer arm 216a.

Trigger 86, preferably embedded within trigger handle 66 is actuated by an operator, preferably causing a Trigger Event. In certain preferred embodiments, there is more than one kind of Trigger Event. In certain preferred embodiments of applicator 210 certain types of either mechanical or electromechanical actuators are preferably used to cause hammer mechanism 216a to trip, being driven toward readied tag 216f, through port 46 for placement on a transport container at the face of bulkhead 211a.

Another means of electromechanical actuation from a Trigger Event initiated by sensor suite 218 is illustrated in FIG. 10 whereby DC motor 215c runs in a reverse direction causing ratchet 216b to become disengaged, allowing hammer 216a to accelerate toward tag 216f due to the torque exerted by spring 216c. Hammer 216a passes between holding rollers 216d to press tag 216f against the face of a transport container.

Interrogator 212d is preferably capable of working with controller 213b to recognize which tags have been recently programmed or applied so as to filter out their response to interrogations of other tags, especially those tags that are being prepared for attachment. Interrogator 212d is preferably capable of modulating its transmitted radio power to affect the range and signal to noise ratio of its coupling to wireless tags.

E. Method of Inlay Conversion

Figure 11:
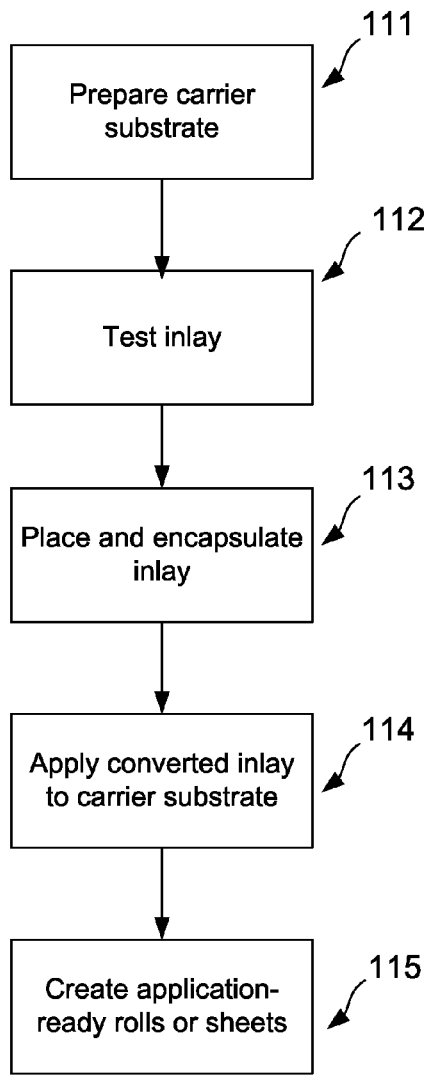
FIG. 11 is a flow chart of a first method according to the present invention.

FIG. 11 shows one method according to the present invention and includes preparing a carrier substrate (Block 111) for use in an RFID transponder or in a wireless sensor that includes both an RFID transponder and sensor device. This process contemplates utilizing adhesive-backed packing tape or some similar material suitable for adhering a commissioned RFID transponder to a container or other object of interest. Certain embodiments for this step include machines to cut large rolls of mesh or net into numerous small rolls with the desired width, length, and core diameter. For example, a supply-roll of stock mesh or net measures about 14-feet wide and about 5000-feet long, rolled onto a core. In one embodiment the supply-roll must be trimmed to fit the width suitable for use in a mobile encoder 30 or similar encoder/interrogator as described in this disclosure.

For certain embodiments, the carrier substrate width is about the length of a simple UHF dipole inlay, as shown, for example, in FIG. 1. In one embodiment the carrier substrate width measures about 4-inches. The length of the carrier substrate depends on many factors including the target cost per transponder of the cartridge and all of its components. Other factors that determine the length of the carrier substrate include the target size and weight of the cartridge and/or the mobile encoder. A possible machine that converts large supply-rolls into smaller ones, in one embodiment, consists of a stand-alone industrial machine. However, in other embodiments, the trimming function is part of an integrated machine.

Block 112 represents the testing process of an RFID inlay comprising, at least, an RFID chip and antenna device. The testing, or interrogation, of the inlay, in one embodiment, includes an interrogator and an antenna or a near field coupler, which read the inlay. This process further includes monitoring various parameters such as activation energy, backscatter signal strength, sensor performance, and other indicators of the quality of the RFID transponder or wireless sensor. Any transponder or tag that does not meet certain minimum performance criteria is discarded. Good transponder or tags are subsequently programmed, encoded, or commissioned with new information relating to the associated object of interest. Such information resides or stores in non-volatile memory within the RFID inlay. Inlays that fail to perform to adequate levels of performance are immediately separated from the process.

Block 113 represents a third process step consisting of applying and encapsulating good inlays in an encapsulation layer or encapsulation zone of the RFID transponder. One possible encapsulation layer comprises a packing tape constructed from pressure sensitive acrylic adhesive and backed by a substrate layer of bi-axially oriented polypropylene film. In certain configurations such packing tapes provide up to about 25,000 volts of ESD resistance when properly applied in about 0.002-inch thick layers of encapsulation. Other packing tapes, available in thicknesses of about 0.001-inches, when combined in layers provide higher ESD voltage resistance ratings. The inlay substrate contributes additional ESD resistance in certain contemplated configurations.

Block 114 represents another process step consisting of applying the converted RFID transponder to an interposing transport media. Such media preserves the tackiness of the exposed adhesive. One possible adhesive includes a pressure-sensitive adhesive, which adheres to most surfaces with very slight pressure and retains tackiness above their melting point of about negative-65 (−65) to about negative-90 (−90) degrees centigrade. In another embodiment, silicone-based release liner is used to transport and preserve pressure sensitive adhesive tags and labels. In other embodiments, the transport media includes utilizing air pockets bounded by regions having tensile strength such as fibers: for example, plastic or metal fibers. Certain plastic resins have a low surface energy and prevent strong adhesive bonds from forming and are bound together to form a mesh or net. Mesh (or net) constructions offer a means of handling converted tags without allowing a substantial percentage of the available adhesive to make contact with any other solids until the tag is commissioned.

Block 115 represents another process step consisting of winding converted transponders onto a spool with the interposing transport media. The core diameter, number of transponders, layer thickness, the thickness of any dielectric foam spacer layer, and outer diameter are all optimized for efficient, economical, and convenient deployment in transponder commissioning processes disclosed herein. Finished spools are packaged in a manner to prevent ESD damage. Certain enclosures include anti-static bags, foil-lined cartons, metal plated cartridges, and carbon-impregnated plastic enclosures. Certain enclosures are reusable. Certain enclosures of application-ready rolls or Z-folded transponders having low energy interposing transport media mate directly with encoders as described in this disclosure.

F. Method of Tagging Containers

Figure 12:
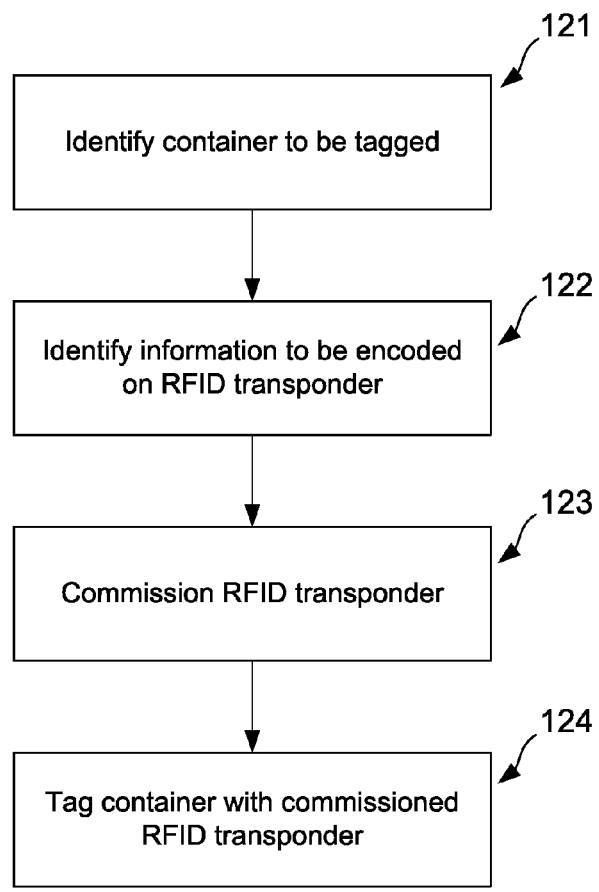
FIG. 12 is a flow chart of a second method according to the present invention.

FIG. 12 is a block diagram representing a second method according to the present invention including applying RFID transponders to objects of interest. One suitable object of interest comprises transport containers such as corrugated cartons or shrink-wrapped cases on a shipping pallet, which is inadequately addressed by the prior-art, particularly for solutions for manually operated automatic encoding and attachment to a container.

Block 121 represents a process step including the identification and selection of a container to be tagged with an RFID transponder or wireless sensor. In one embodiment this step includes a manual selection and verification processes that consists of manual handling, visual sighting, and scanning bar codes with a hand-held optical reader device. This method contemplates that a transponder encoding scheme is ready in advance and synchronized with a pick list, customer purchase order, advanced shipping notice, and other such records to assure that goods are properly moved and accounted for. Preferred bar code scanners include those that allow an operator to freely handle cartons with two hands. Such scanners include laser bar code scanners or imagers that are worn on either that back of the operator's hand or near the top knuckle of a finger. Such scanners are described above, and preferably have a Bluetooth or similar wireless interface to connect to mobile encoder 175 or 30. Bar code scanner 226 of FIG. 21 is a preferred embodiment of an alternative device that combines manual bar code scanning and RFID transponder encoding into a single handheld device. The operator may choose to scan bar codes that contain data, application identifiers, commands, or other elements commonly found in automatic data capture applications.

Block 122 represents the process step of processing bar code information to derive the underlying data. Depending on the type of bar code, how it is encoded, and its purpose, different processing steps will be used. In preferred embodiments the bar code may contain SKU information, a GTIN, an SGTIN, EPC data structures, a military UID, an SSSC, an asset number, a file identifier, or other such identifying information. In certain preferred embodiments, the bar code (either one or two dimensional) contains a partial or complete description of the data that is to be encoded into the RF transponder. Such bar codes are described in ISO/IEC draft document PDTR 24729-1. Application identifiers 01 and 21 are combined with additional encoded printed information to fully specify a serialized GTIN (or SGTIN). Using such bar codes does not require the use of additional data in order to generate RF transponder payload data. Mobile encoder 175 may therefore independently receive and process the RF transponder payload information. One type of bar code is used to signal mobile encoder 175, 30, or 220 that it should enter a mode whereby it performs a serialization algorithm without using an AI 21 bar code. This process step of identifying the information to be encoded may be included in the step represented by Block 121. In this step (Block 122), an operator may use a bar code reader or an encoder/interrogator of this disclosure. Alternatively, the operator may receive instructions delivered to a hand-held PDT or other mobile data terminal connected to a wireless network. This information is delivered to an encoder, such as encoder 30.

Block 123 represents another process step whereby, using a mobile encoder, the operator then commissions an RFID transponder with the information of the previous step (Block 122). Optionally, successful commissioning of the RFID transponder is verified by the encoder. In one embodiment, the encoder tests the next transponder and determines if it is operating within certain predefined specifications including parameters such as activation energy, backscatter signal strength, sensor performance, and other indications of the quality of the transponder. If the encoder determines that the transponder is not likely to result in a successful transponder deployment as may be determined by failure on multiple encoding and verification attempts or due to either physical or electronic deficiencies or abnormalities, then the operator is informed and the failed or bad transponder is discarded automatically or when an operator pulls a trigger under an operator-acknowledged transponder failure condition.

This step (Block 123) also includes processes to read or determine by dead reckoning the information encoded into certain preprinted optically encoded symbols on the outward facing non-adhesive surface of the adhesive tape. In certain embodiments the adhesive tape is printed with information. In other embodiments the printed information is a machine-readable symbol such as a bar-code symbol. For example, one or more machine-readable symbols are read when the tape is prepared for use in an automated encoder or, alternatively, during the inlay conversion process and conveyed to an encoder through other data storage means, such as an RFID transponder. In one embodiment, an information encoding method uses either one-dimensional or two-dimensional bar codes. In some embodiments a linear imager is used to read either linear or two-dimensional bar codes as the tape is being unrolled from a spool. Some encoding schemes preprint machine-readable symbols at regular intervals along the length of a roll of adhesive tape. In certain embodiments the spacing of the preprinted symbols is at an interval of one half of the nominal length of each section of adhesive tape. In certain embodiments, the encoded information is used as a reference to one or more data storage locations. In other embodiments the data storage locations are accessible through a computer network. In some embodiments, the encoded information is a series of sequential numbers. Information relating to data stored in the RFID transponder is stored in data storage locations that are referenced by one or more of the preprinted symbols. In an alternative embodiment more than one type of machine-readable symbols can be read from the surface of a segment of tape. In certain embodiments, more than one machine-readable symbol is used as a reference to the same or closely related data records of information stored in the RFID transponder or inlay, and either can be successfully used to access stored data.

In some encoders used in this step (Block 123) a Trigger Event occurs, which results in the verification that a particular commissioned RFID transponder has been tagged and associated with a specific container. This Trigger Event occurs, in certain embodiments, when an operator pulls a trigger on the encoder. In other embodiments the Trigger Event occurs when certain sensors detect preprogrammed conditions relating to the proximity of the encoder face to an object that is to be tagged.

Finally, (Block 124) the operator applies the RFID transponder on the container and, thus, commissions the transponder. In certain embodiments, the location of the targeted placement of the RFID transponder or wireless sensor on the container is stored in a database, which is referenced or pointed to by information that is stored in the memory of the encoder. In one embodiment, the operator holds the encoder against the face of the container based on the tagging requirements for that particular container. The tagging requirements including the location and orientation of the RFID transponder to be placed is conveyed visually or aurally. For example, the operator receives visual information via a screen or display on the encoder. In certain embodiments, physical indicators are attached to the encoder and extend from its body in a direction and manner so as to assist the operator in the positioning of the transponder onto the carton. In other embodiments, transponders are applied to the interior of a carton, before it is sealed.

G. Method of Commissioning RFID Transponders Using a Mobile Applicator.

Figure 13:
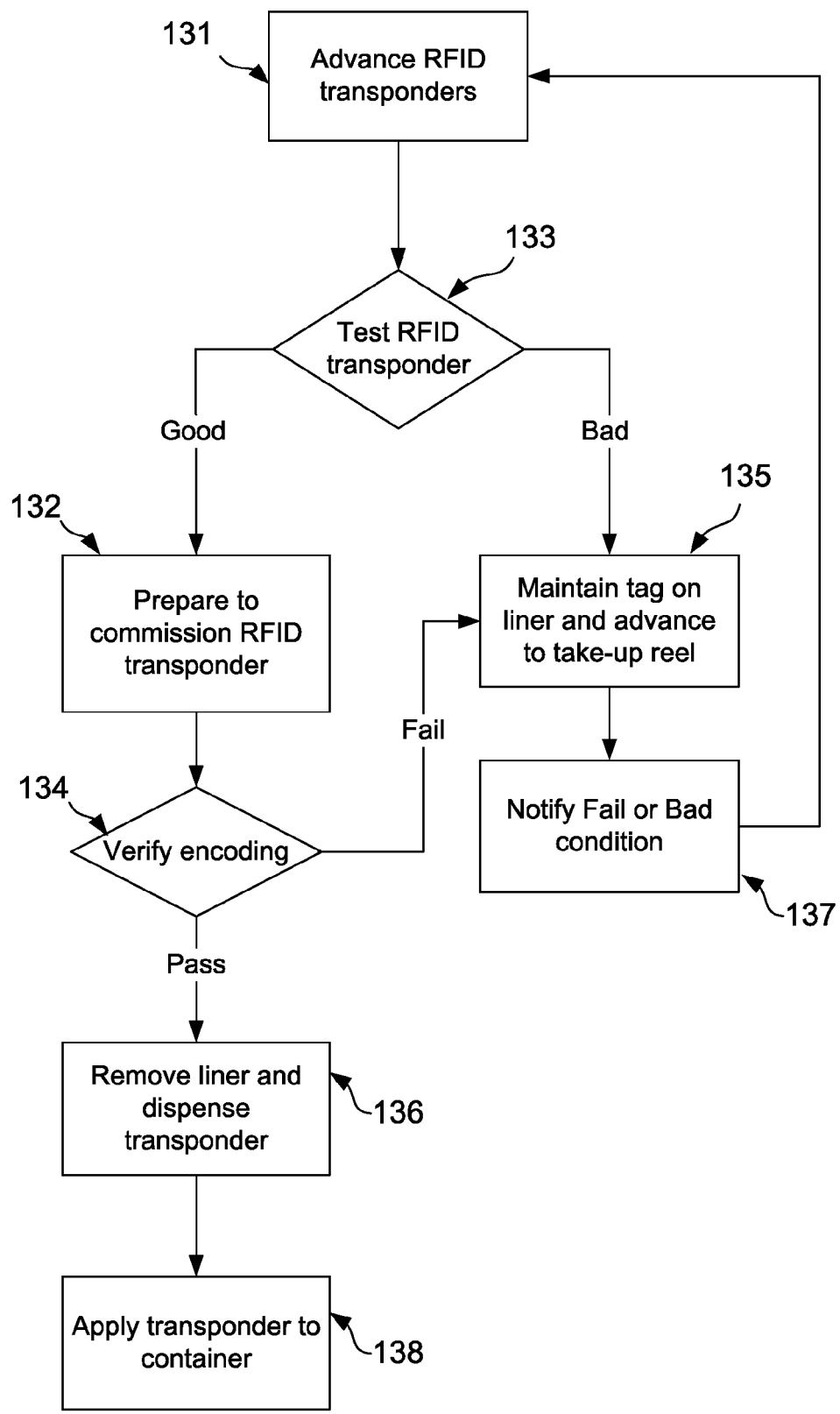
FIG. 13 is a flow chart of a third method according to the present invention.

FIG. 13 is a block diagram showing a method according to the present invention for commissioning RFID transponders using an encoder, such as the encoder 30, couples to a cartridge or protective enclosure containing a plurality of RFID transporters releasably mounted on a transport sheet or roll. The encoder enables the roll of RFID transponders to advance one position (Block 131), placing the Next Tag in a test 1 position. The Next Tag is tested (Block 133) to ensure that it performs within predetermined parameters such as activation energy, backscatter signal strength, sensor performance, and other indications of the quality of the transponder. One possible method includes encoding a transponder using only a minimal amount of radio-frequency energy. Since transponder encoding requires more energy than reading a transponder, this low power test constitutes a basic test of both minimal activation energy and backscatter signal strength.

An RFID transponder that fails this test (Block 133) results in a "Bad Tag" status and proceeds to the take-up reel of the encoder (Block 135). Thus, any failed transponder remains captive in the cartridge and cannot be released from the encoder by an operator. Optionally, the operator is notified of the failed transponder so the operator can request a newly encoded transponder (Block 137). However, in one embodiment, the notification step occurs automatically, and a newly encoded next transponder is generated without input from the operator.

Block 132 shows that a "good" transponder is positioned in the encoder for the encoding process. The RFID transponder that passes the test 1 position is commissioned with predetermined data based on the container to be tagged. Methods of obtaining, storing, encoding, and commissioning this information on the RFID transponder are discussed elsewhere in this disclosure.

The commissioned transponder undergoes a verification process (Block 134) to determine if the intended information was successfully encoded on the RFID transponder. Certain embodiments combine the verification step with the encoding step to gain operational efficiencies. If this verification test results in a fail condition, the transponder remains in the encoder and ultimately winds on the take-up reel in the cartridge for subsequent post-mortem failure analysis.

Block 136 represents a pass condition. The encoder removes the commissioned RFID transponder from the transport web or release liner, enabling the operator to retrieve the transponder from the encoder and in Block 138 apply the transponder to the container. In an alternative embodiment for Block 138, the operator or a fixture holds the encoder against a surface of the container and the encoder places the commissioned RFID transponder directly on the container without operator intervention.

H. Method of Providing RFID Transponders to an Encoder.

Figure 14:
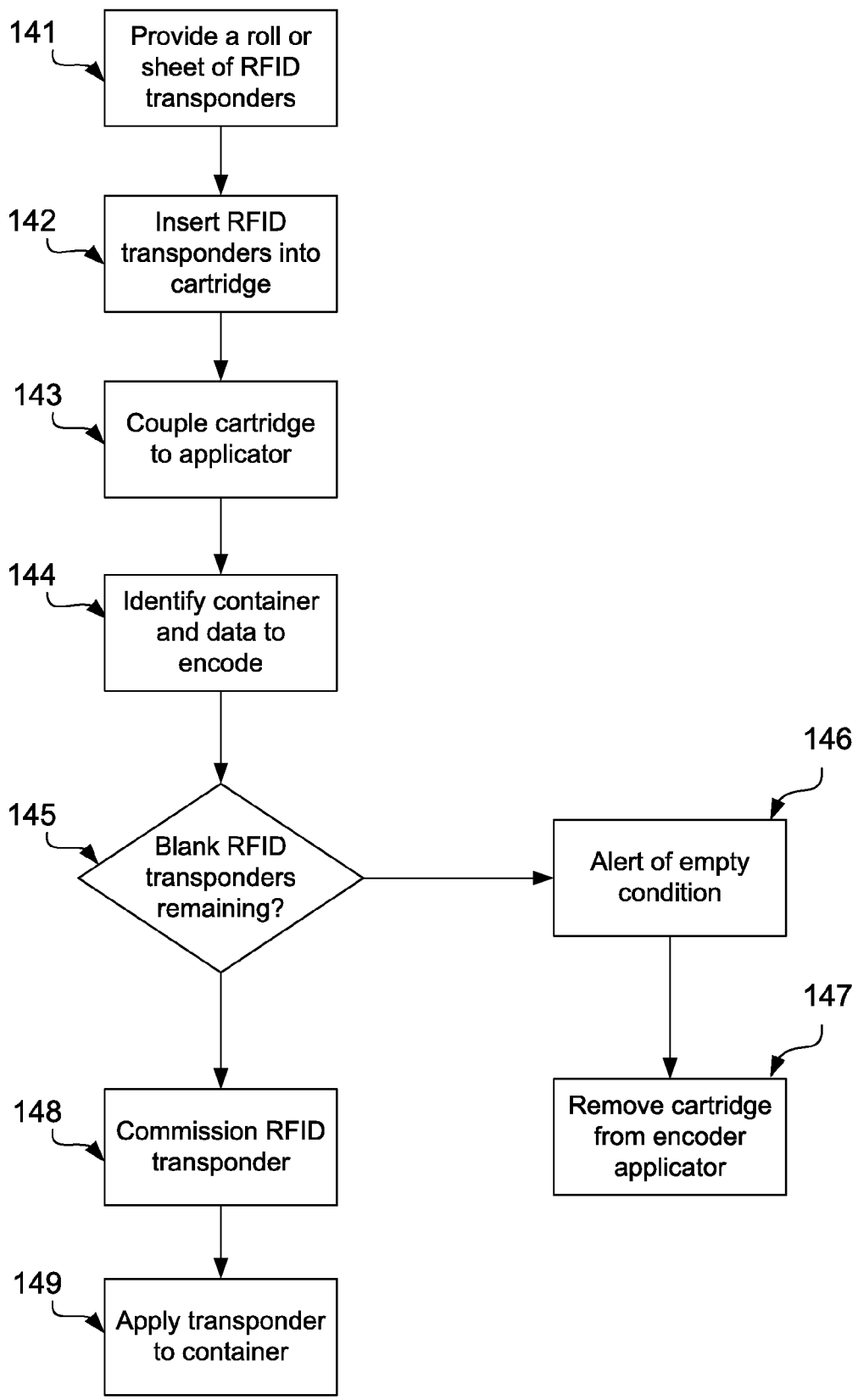
FIG. 14 is a flow chart of a fourth method according to the present invention.

FIG. 14 is a block diagram showing another method according to the present invention. One step, represented by Block 141, includes providing suitable RFID transponders such as the transponder 50 of FIG. 2, which are presented on a sheet or roll, such as sheet 59 of FIG. 4.

Block 142 shows the process step of inserting the roll of RFID transponders into a cartridge of an encoder such as cartridge 42 of FIG. 5. Steps 141 and 142 are ideally suited for off-site repairs and replacements of cartridges. Accordingly, a customer may send a used cartridge to a repair facility, enabling the cartridge to be recycled.

At a point-of-use location, such as a customer's warehouse or packaging facility, a fresh cartridge full of blank, or non-commissioned, RFID transponders attaches to an encoder adapted for such use (Block 143) and is used normally (Block 144), as previously described herein, to identify containers and data to encode on an RFID transponder. Prior to encoding, (Block 145) the encoder verifies that a non-commissioned transponder remains in the cartridge. If such a transponder is available (Block 148) the RFID transponder is commissioned and in certain embodiments applied to the container (Block 149) by means previously disclosed herein. If the cartridge is empty (Block 146), the operator is alerted by various known means described herein or otherwise known by those skilled in the art. And, the cartridge is removed (Block 147). The removed cartridge is sent to another location, a recycling, re-use, repair, or re-building center that is either on or off-site, or is discarded.

I. Method for Recycling Used Cartridges of RFID Transponders.

Figure 15:
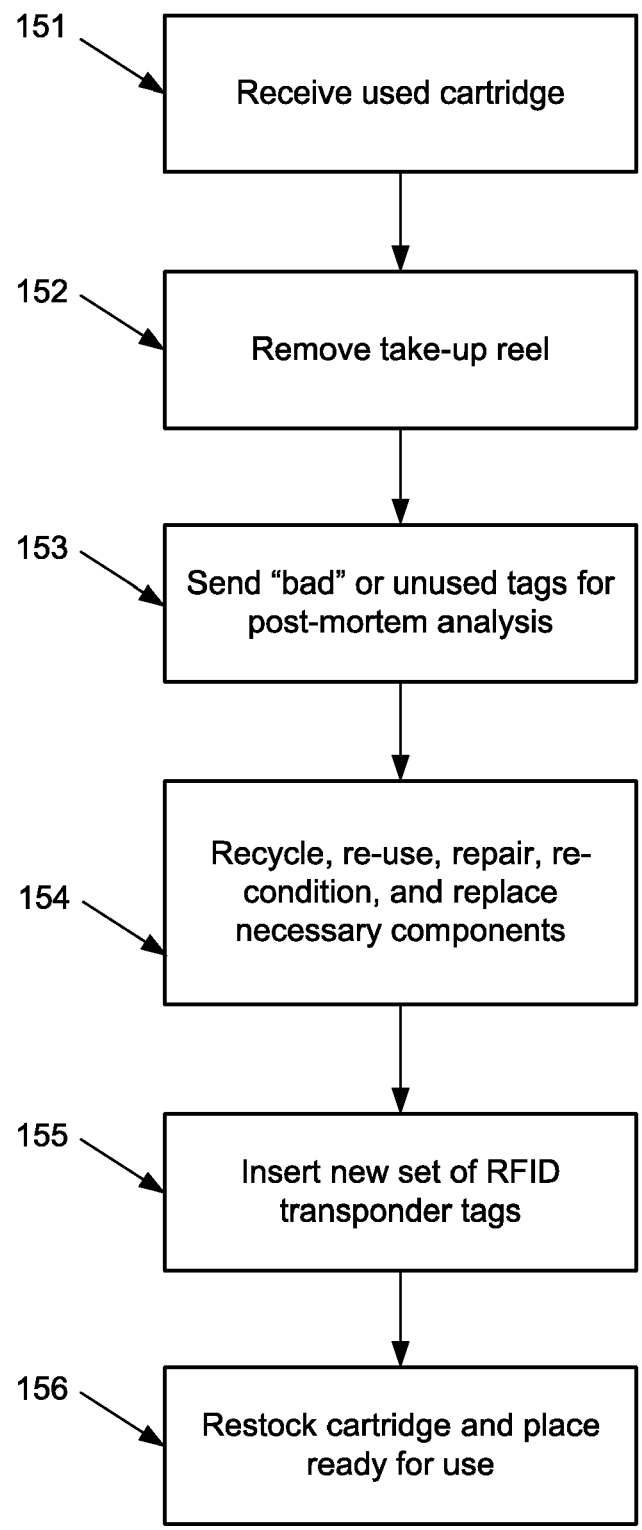
FIG. 15 is a flow chart of a fifth method according to the present invention.

FIG. 15, a block diagram, shows a method for recycling cartridges from, for example, a process similar to the one shown in FIG. 14. A repair center receives the used cartridge (Block 151). In one embodiment, the repair center is off-site from the customer, and allows specialized repair, reconditioning, re-use, recycling, and replenishment to provide cost-effective and environmentally sensible replacement cartridges.

A plurality of cartridges 42 are preferably disassembled for easy recycling. For example, end users may choose to reduce their shipping costs for the recycling of cartridges and release liner by separating them into different recycle waste streams at the point of use. Conversely cartridges 42 are manufactured and assembled by snapping together the mating components with latches, guide pins, slots, and other such features to mechanically secure themselves into a rugged structure, capable of tolerating the abuse that is common for shipping and handling. After each use, cartridges 42 are preferably disassembled such that similar parts of like cartridges all nest within each other to form a dense stack. Each stack can then be accumulated and shipped either together or separately back to a transponder recycling facility. The spent release liner and any rejected transponders may also be accumulated separately and may optionally be sent to a different preferred waste processing facility, possibly in order to reduce shipping costs. One such facility preferably has the ability to reprocess release liner, both silicone and non-silicone-based materials. Certain silicone alternatives include emulsion release coatings that are water-based coatings that offer similar performance to hydrocarbon solvent-based release liner products. Emulsion coatings are compatible with paper repulping processes and are highly preferred. The benefits of the silicone alternative coatings are not normally available to the RFID tagging work flows because proper attention has not been given to solving this environmental problem. Therefore, by controlling both the composition of the outbound materials as well as the inbound recycling processes, this cartridge-based method of transponder encoding offers real promise for reducing stress on the environment.

In certain embodiments, a protective enclosure and RFID transponder recycling center reduces the amount of waste associated with enabling the convenience of tagging and safely handling RFID transponders and devices such as encoders or interrogators. For example, plastics and silicone are non-biodegradable materials that are suitable for recovery, re-use, and recycling. Certain plastic parts including take-up reels are disassembled and removed in Step 152, hub-cores are recycled for paper waste, and silicon-coated release liner is accumulated and separated from the recyclable (re-pulpable) paper for proper handling, recovery, and disposal—if needed. In Step 153, failed tags from Step 134 of FIG. 13 are preferably subjected to post-mortem analysis. In Step 154 cartridge 42 is replaced by either a new (virgin) cartridge or a refurbished cartridge, as appropriate and such replacement cartridge is in Step 155 replenished with blank RFID transponders, such that in Step 156 the cartridge 42 is restocked, ready for use.

Recycling continues with the RFID transponders as well. In certain embodiments, the RFID transponder 50 is configured and adapted for re-use. Accordingly, the data is wiped and re-coded as appropriate. In other embodiments portions of the RFID transponder are recycled. For example, the aluminum antenna separates from the encapsulation layer and is recycled. The paper stock is recovered and re-pulped.

In certain embodiments, replenishment of empty cartridges or magazines is performed as a service at a customer's site such as a warehouse, distribution center, packing plant, 3PL logistics center, or a manufacturing plant.

Figure 16:
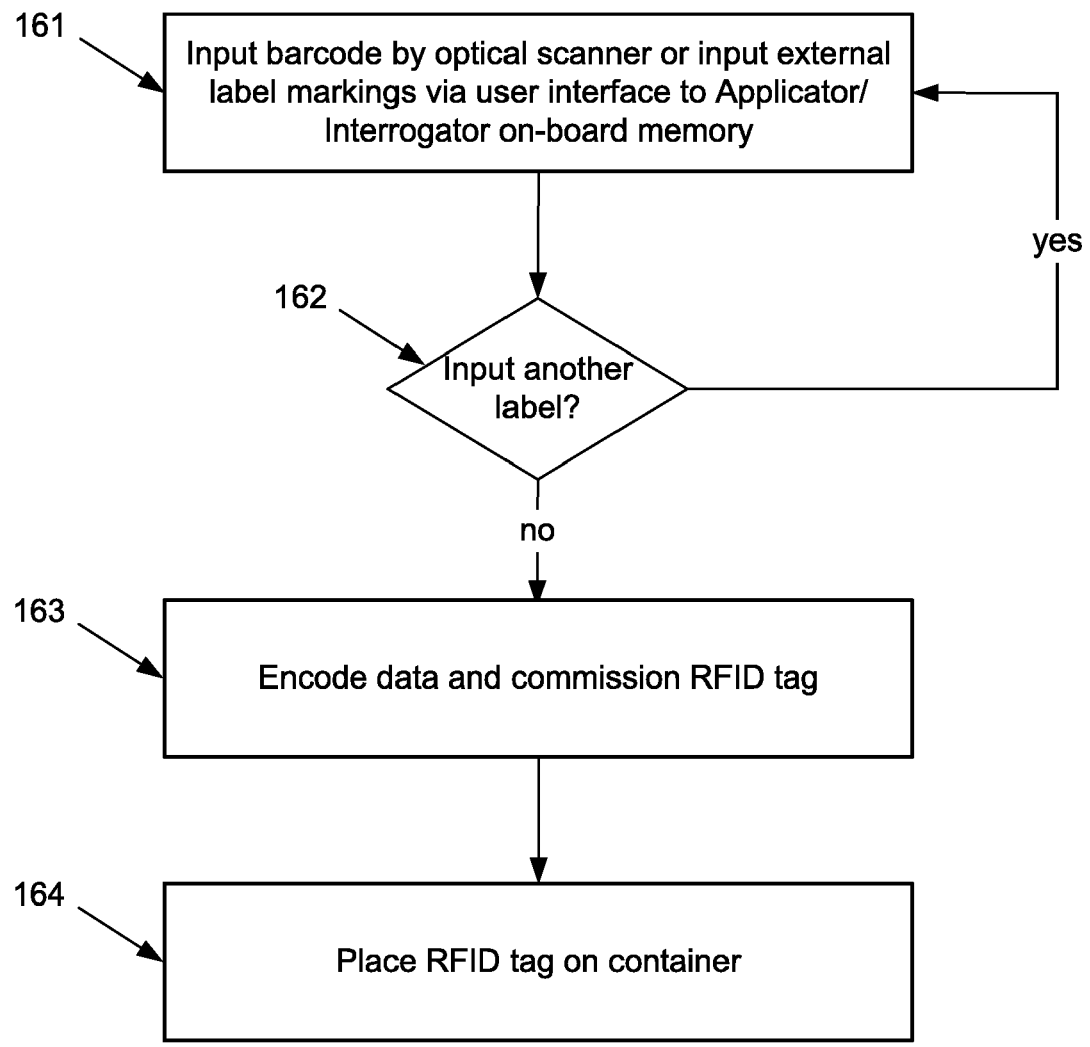
FIG. 16 is a flow chart of a sixth method according to the present invention.

FIG. 16, a block diagram, shows another method according to the present invention and consists of an algorithm for determining when an RFID transponder is commissioned based on predetermined criteria. For example, a shipping container typically includes a mixed lot of products. Accordingly, several different product-identifying bar codes are serially scanned (Block 161) until an end of condition event occurs (Block 162). This end of condition event may be queried after each scan or provided to an interrogator/encoder based on a supplied heuristic (i.e. volume, weight, etc.), pack list, or other customer-driven data.

Once all data is compiled and stored on the encoder, an RFID transponder is commissioned and encoded with the data or a logical pointer to a storage location of the data (Block 163). Then, it is applied to the container (Block 164) by means discussed previously herein.

Block 242 represents the process step whereby mobile encoder 175, 30, or 220 encodes an RFID transponder with the information of the previous step (Block 241).

Successful commissioning of the RFID transponder is preferably verified by the encoder as shown in Block 243. In one embodiment, the encoder tests the immediate transponder and determines if it is operating within certain predefined specifications including parameters such as activation energy, backscatter signal strength, sensor performance, and other indications of the quality of the transponder.

If in Block 244 the encoder determines that the transponder is not likely to result in a successful transponder deployment as may be determined by failure on multiple encoding and verification attempts or due to other evidence of physical or electronic deficiencies or abnormalities, then the operator is optionally informed and the failed or bad transponder is discarded automatically as shown in Block 245.

Block 246 is the process of using motor 227B and/or transponder transport means 175C to pull release liner 182 tighter and tighter such that webbing 182 advances forward to the point that the leading edge of transponder 178 extends past the distal end of peel device 183 or 222B.

In Block 247 web 182 is pulled forward to the point that transponder 178 or 223A begins to rotate around peel device 183 or 222B. It is in this step that either a human finger or some target object needs to be presented in the rotational path of the tipping transponder 178 or 223A must be located. In the case of mobile encoder 30 where the operator is required to handle the encoded tag, it is important that their finger be present as transponder 178 begins to tip, allowing adhesive layer 181D of transponder 178 to make contact and be removed for placement on a target object such as a shipping container, trackable asset, automobile windshield, or other object of interest. In cases where the operator scans a bar code and applies encoded transponder 178 in a single motion, mobile encoder 220 is preferred, wherein as transponder 178 tips as it rotates around peel device 222B adhesive layer 181D sticks directly onto target surface 228. In either case, encoded transponder 178 is caught mid-rotation and adhesive layer 181D provides adhesive forces sufficient to completely detach transponder 178 from release liner 182, thus completing the function of Block 247 where work flow returns to Block 240 for another transponder encoding cycle to begin.

While the invention has been particularly shown and described with reference to certain embodiments, it will be understood by those skilled in the art that various changes in form and detail may be made without departing from the spirit and scope of the invention.

I claim:

1. A method that provides unique object numbers for on-demand commissioning of RFID transponders using an RFID encoder having an internal memory to intermittently receive allocations of blocks of subdivided object class serial number space from an external numbering authority, the method comprised of:

the external numbering authority allocating blocks from the allocations of blocks of subdivided object class serial number space, from a larger object class serial number space, to the encoder's internal memory for encoding unique object numbers into the RFID transponders as objects of an object class are presented to the encoder for RFID transponder encoding;

the allocations of blocks of subdivided object class serial number space being allocated by subdividing the larger object class serial number space into sectors that are defined by a limited number of most significant bits of the object class serial numbers; and assigning to the RFD encoder the allocated blocks with reference to the starting number of each of the allocated blocks and the size of each of the allocated blocks that the RFID encoder is authorized to encode within an object class.

2. The method of claim 1 further comprising the step of determining which object class the RFID transponders are to be encoded to by reading a bar code which contains a partial description of the data that is to be encoded into the RFID transponders.

3. The method of claim 2 wherein the bar code contains SKU information.

4. The method of claim 2 wherein the bar code can be either one or two dimensional.

5. The method of claim 2 wherein the bar code is read and the encoded RFID transponders are each individually applied to a different one of the objects in a single motion.

6. The method of claim 1 wherein the allocated blocks of subdivided object class serial number space are issued to the encoder by a host computer or mobile phone.

7. The method of claim 1 wherein the allocated blocks of subdivided object class serial number space are issued to the encoder by an RFID authorization transponder.

8. The method of claim 7 wherein the RFID authorization transponder is read by the encoder and is then electronically marked as 'consumed' or 'locked' by the encoder.

9. The method of claim 1 further comprising the step of using a counter or index to manage each allocated block.

10. The method of claim 1 wherein the encoding of unique object numbers uses a near field coupler.

11. An encoder and applicator device for commissioning RFID transponders on-demand, allowing an operator of the device to encode and apply an RFID transponder in a single motion, the device comprising:

an operator handle;

a trigger embedded within the handle adapted to be actuated by the operator;

a transponder separation means, used to separate a properly encoded RFID transponder from its release liner conveyance web, the means comprised of a peel device which allows an encoded RFID transponder to tip as it rotates around the peel device and allows its adhesive layer to stick directly onto a target surface;

an internal bar code scanner that is used to acquire information to encode from printed indicia, the bar code scanner spatially aligned with the transponder separation means along a line of movement such that the operator can easily assure proper placement of the properly encoded RFID transponder in a single motion;

a sensor that tracks displacement of the encoder and applicator device across the target surface allowing the attachment of the properly encoded transponder to the target surface along a vector that is nearly parallel to the target surface; and an interrogator used to encode an RFID transponder and verify the encoded RFID transponder immediately after encoding the RFID transponder and then again after the encoder and applicator device applies the properly encoded RFID transponder onto the target surface.

12. The device of claim 11 wherein the encoder and applicator device is able to be mounted in a fixed location, worn by a human operator, or hung from a suspended retractable tool cable.

13. The device of claim 11 wherein the trigger is a mechanical trigger or an electro-mechanical device.

14. The device of claim 11 wherein the sensor that tracks displacement of the encoder and applicator device across the target surface is an optical sensor.

15. The device of claim 11 wherein the target surface is moving.

16. A plurality of commissioned RFID transponders each comprising a unique object number encoded by an encoder having an internal memory with at least one allocated block of subdivided object class serial number space stored therein;

the allocated block having been allocated to the encoder's internal memory;

the allocated block assigned to the encoder with reference to a block starting serial number and a block size number within a larger object class serial number space;

the allocated block being one of a plurality of allocations intermittently received from an external encoding authority;

the external encoding authority comprised of subdivisions of the larger object class serial number space into sectors that are defined by a limited number of most significant bits of the object class serial numbers; and the unique object number encoded into one of the plurality of RFID transponders as an object of the object class is presented to the encoder.

17. The plurality of transponders of claim 16, each transponder further comprising a single unique object number.

18. The plurality of transponders of claim 16, each transponder further comprising a unique object number that is part of a serialized global trade item number.

19. An object number encoded into an RFD transponder of the plurality of transponders according to claim 16 wherein the object number is encoded using a near field coupler.

* * * * *